US005627438A

United States Patent [19]
Barrett

[11] Patent Number: 5,627,438
[45] Date of Patent: May 6, 1997

[54] PULSING CONTROL FOR AN INERTIAL DRIVE SYSTEM FOR A MULTI-MOTOR BINARY ARRAY VEHICLE

[76] Inventor: Robert D. Barrett, 10261 Canterbury St., Westchester, Ill. 60154

[21] Appl. No.: 378,173

[22] Filed: Jan. 25, 1995

[51] Int. Cl.$^6$ .................... B60K 1/02; B60K 31/04; B60L 11/18
[52] U.S. Cl. .................. 318/139; 318/51; 318/54; 318/59; 318/67; 318/268; 318/376; 180/178; 123/349; 123/350
[58] Field of Search ................ 318/34, 51, 53, 318/59, 60, 61, 66, 67, 139, 268, 269, 270, 271, 273, 274, 276, 375, 376, 54, 55; 364/426.01, 426.04; 180/170, 178, 179, 65.1, 65.2, 65.4, 65.8; 290/7, 9, 45; 60/713, 716, 718; 123/319, 349, 350, 351, 352, 353

[56] References Cited

U.S. PATENT DOCUMENTS

| | | |
|---|---|---|
| 2,717,523 | 9/1955 | Lammerz . |
| 3,572,176 | 3/1971 | Bildat . |
| 3,596,154 | 7/1971 | Gurwicz et al. ............ 318/52 |
| 3,630,304 | 12/1971 | Sahinkaya . |
| 3,646,414 | 2/1972 | Gurwicz ................... 318/67 |
| 3,647,017 | 3/1972 | Brainard et al. . |
| 3,783,360 | 1/1974 | Bundy . |
| 3,799,284 | 3/1974 | Hender . |
| 4,090,415 | 5/1978 | Gorrell et al. . |
| 4,269,280 | 5/1981 | Rosen . |
| 4,306,462 | 12/1981 | Meixner . |
| 4,392,393 | 7/1983 | Montgomery . |
| 4,403,293 | 9/1983 | Bradt et al. . |
| 4,407,132 | 10/1983 | Kawakatsu et al. . |
| 4,550,379 | 10/1985 | Kawai et al. . |
| 4,579,019 | 4/1986 | Gabriele . |
| 4,581,725 | 4/1986 | Pilarcik, Jr. . |
| 4,645,940 | 2/1987 | Wertheim . |
| 4,684,854 | 8/1987 | Sankey . |
| 4,768,602 | 9/1988 | Inoue et al. . |
| 4,905,153 | 2/1990 | Suzuki et al. ............ 364/426.04 |
| 4,914,595 | 4/1990 | Suzuki et al. ............ 364/426.04 |
| 5,081,365 | 1/1992 | Field et al. ............... 290/45 |
| 5,301,764 | 4/1994 | Gardner ................. 180/65.2 |

FOREIGN PATENT DOCUMENTS 1-136827  5/1989  Japan .

OTHER PUBLICATIONS

Boardman, Mark D., "Shift–Mate A Fuel Efficiency Monitor," SAE Publication, SAE Technical Paper Series No. 852340, Dec. 9, 1985.

Kawamura et al., "Toyota's New Single–Chip Microcomputer Based Engine and Transmission Control System", SAE Publication, Developments in Electronic Engine Management and Driveline Controls, SP–609, pp. 1–8, Feb. 25, 1985.

Bass et al., "C.E.M.—The Alfa Romeo Engine Management and System–Design Concepts–Trends for the Future," SAE Publication, Developments in Electronic Engine Management and Driveline Controls, SP–609, pp. 9–20, Dec. 25, 1985.

(List continued on next page.)

*Primary Examiner*—Bentsu Ro
*Attorney, Agent, or Firm*—Juettner Pyle Lloyd & Piontek

[57] ABSTRACT

A pulsing drive system delivers pulsed power signal of the driven wheels of a vehicle for improving the efficiency internal combustion or an electric motor driven vehicles. A controller receives signals such as velocity and demand, and communicates to a means for selectively communicating energy wherein the means for selectively communicating energy converts the pulse signal to a correspondingly conditioned power pulse for powering the vehicle. When combined with a plurality of motors sized with optimal horsepower ranges according to a binary array, an arrangement of such motors provides for an optimally efficient operation of the vehicle by bringing on-line strategically selected combinations of the motors. A control system selectively brings on-line the multiple motors.

26 Claims, 10 Drawing Sheets

OTHER PUBLICATIONS

Arnett et al., "High Integration Microcomputer Yields Total Vehicle Communication Solution," SAE Publication, Developments in Electronic Engine Management and Driveline Controls, SP–609, pp. 65–73, Feb. 25, 1985.

Shibuya et al., "Optimum Control Logic for Manual Transmission," SAE Publication, Developments in Electronic Engine Management and Driveline Controls, SP–609, pp. 65–73, Feb. 25, 1985.

Birch, Stuart, "Future Engine Designs," Automotive Engineering magazine, Jun. 1990, pp. 76–79.

Foster et al., "Heavy–Duty Diesel Fuel Economy," Mechanical Engineering magazine, Dec. 1982, pp. 50–55.

*Chicago Tribune* Sunday, Nov. 25, 1990, Transportation section (#17), article entitled: "The 2001".

Siuru, Bill, "Dual–Power Autos Take the Wheel," Mechanical Engineering magazine, Aug. 1990, pp. 40–44.

Sherman, Don, "Synchronicity," Car and Driver magazine, May 1985, pp. 48–54.

Hames et al., "DDEC II Advanced Electronic Diesel Control," SAE Technical Paper Series No. 861110, Aug. 4, 1986.

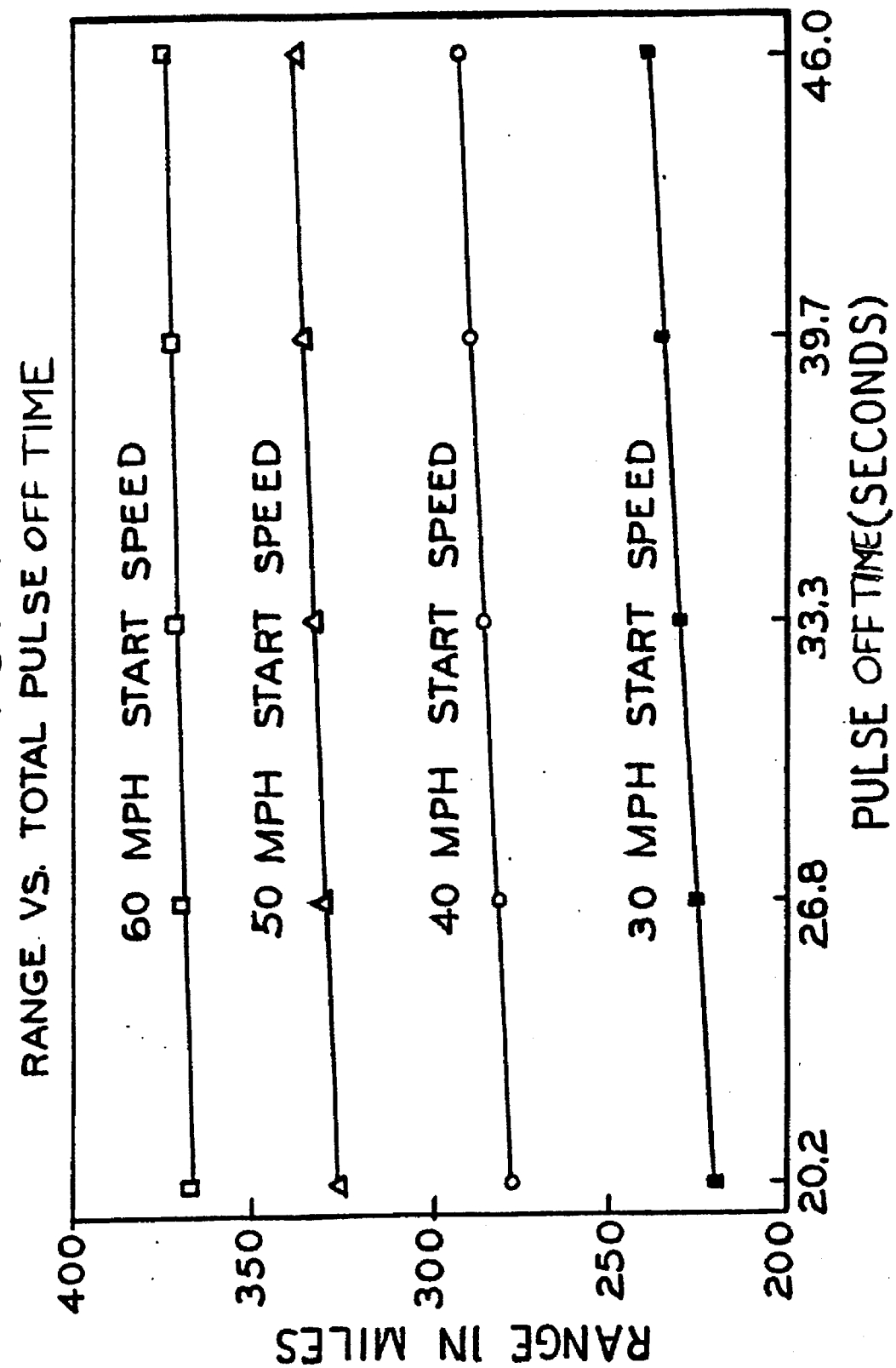

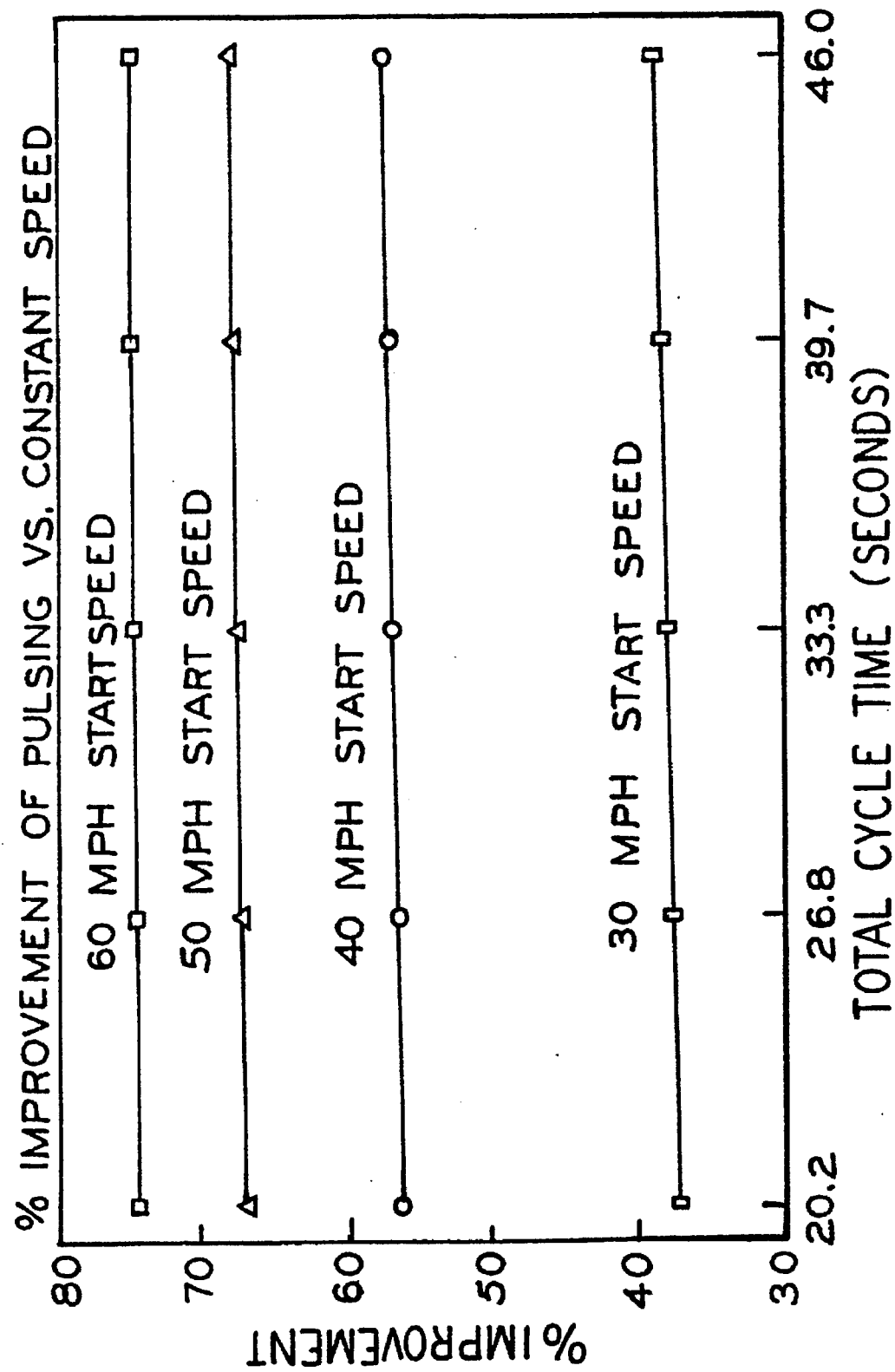

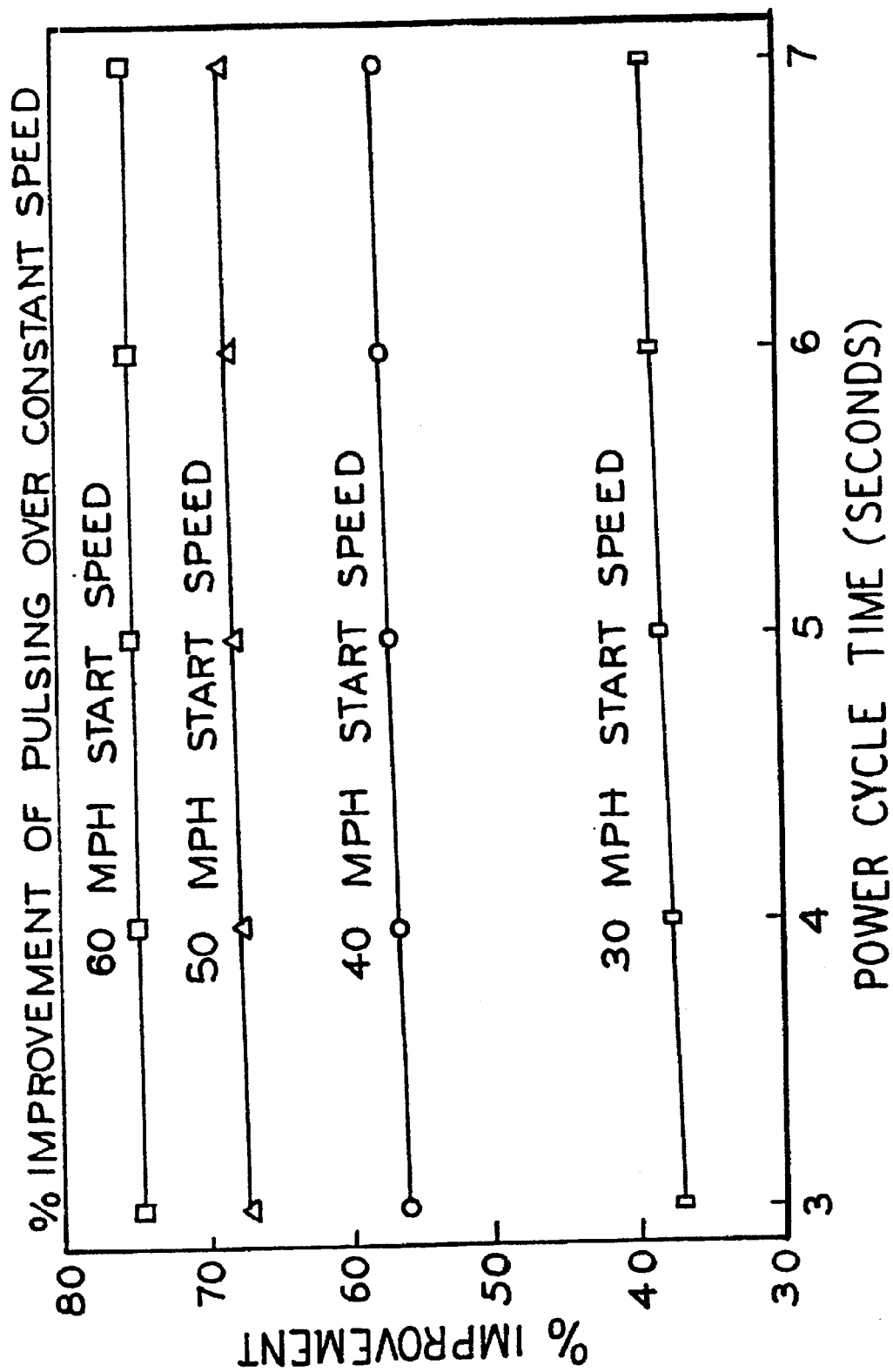

PULSING CONTROL FOR AN INERTIAL DRIVE SYSTEM FOR A MULTI-MOTOR BINARY ARRAY VEHICLE

This application is a substitute application for application Ser. Nos. 07/597,206 and 07/692,627, filed respectively on Oct. 9, 1990 and Apr. 29, 1991, both of which are abandoned. These applications are in essence duplicated in combination herein.

BACKGROUND OF THE INVENTION

1. Field of the Invention

This invention relates to apparatus and methods to improve driveline efficiency, such as used in a vehicle, through an improved motor control system with inertial utilization and strategic combinations of driveline motive sources or motors. More particularly, this invention provides a drivetrain for a wheeled vehicle having mass, a driveline including a motor and inertial components, a controller receiving a desired velocity signal, and a selectively means for communicating energy for rotation of the motor, where the controller communicates pulsed signals to the means for selectively supplying energy for rotation of the motor in power pulses in accordance with pulsed signals from the controller. The motor can include internal combustion engines and electric motors, wherein power from the motor is pulsed to the driveline. Additionally, this invention provides a regenerative braking system which can also utilize a pulse system, preferably derived from the same controller that controls the power pulses, providing an anti-lock braking system.

The invention also advantageously utilizes multiple motors. Accordingly, this patent application also relates to a motor vehicle having a plurality of motors used in selective strategic combinations delivering efficient power to a wheel propelling the vehicle. In particular, this application also relates to binary sizing of the selected motors for installation into the vehicle. A control scheme is presented strategically bringing on-line the various motors for closely matching the horsepower requirement with the most efficient use of the selected motors.

2. Description of the Prior Art

Electric motor driven vehicles having battery storage means are known. However, such systems often lack sufficient driving range before recharging. In the present state of the art, a typical driving range between recharging is about 120 miles. Increasing this range to higher values is most desirable.

Regenerative braking is also known. In regenerative braking, energy normally dissipated by conventional brakes (i.e., lost as heat at the brake shoe or disk) is instead harnessed by transfer of the braking energy to an energy storage medium. Typically, electrical generators are utilized for regenerative braking and associated battery packs store energy which would otherwise be dissipated. Other means, such as a flywheel, can also be used.

It is also known in the art to combine multiple motors in a four-tired vehicle. However, those attempts known in the art have been to install motors of comparably equal size increasing the overall horsepower output of the vehicle. Not known in the art is strategically sizing a combination of motors and selectively coupling those motors for operation at or near an optimum horsepower output (maximum torque output at corresponding rotational speed) matching the instantaneous vehicle horsepower requirement.

It is also known in the art to provide a combination of a gas driven engine and an electric motor in an attempt in increasing fuel economy or reduce pollution. The selective coupling of strategic sizes of motors as not disclosed in the known art.

Moreover, it is not known to combine a pulsing system for a motor with a strategic motor size combination obtaining an overall efficiency of operation over a range of vehicle operating conditions.

SUMMARY OF THE INVENTION

The invention relates to a power application and control system for a motor-driven inertial driveline, such as a motor, transmission, driveshafts and driven wheels of a vehicle, wherein power from the vehicle's motors is pulsed through the vehicle drive-train. The motors can be either gas or gasoline-fired engines, such as internal combustion engines or a turbines, or electric motors.

Herein, the motor is run intermittently in a generally pulsing on/off fashion wherein the motor may be operated at or near full load with maximum efficiency during the "on" cycle, while the kinetic energy of the vehicle and drive-line inertial masses are utilized during the "off" cycle. Batteries and vehicle weight provide the inertia utilized during the "off" cycle. Indeed, according the present invention, larger, heavier vehicles are desirable, as the amount of inertia is increased. Beneficially, it has been found that heavier vehicles, such as full-sized steel automobiles, tend to be relatively safer than lighter vehicles, and offer greater ride and drive comfort.

By pulsing the power from the motor to the drive train, Applicant has calculated and anticipates greatly increased economies and extended driving ranges on a similar set of batteries as compared to conventionally powered vehicles.

Applicant's regenerative braking scheme provides a convenient means for conserving energy during operation of the vehicle as well as provides for an effective anti-lock braking means wherein the regenerative braking can be exercised in pulsing fashion preventing "locking up" of wheels and tires, especially on icy or slippery conditions. Also, battery damage through recharging can be avoided.

Applicant's control scheme can be accomplished in exemplary fashion with cruise control, and particularly voice activated cruise control. Applicant's control scheme as disclosed herein can be readily adapted to a multiple motor inertial drive vehicle for increased efficiencies.

Selecting the multiple motors according to a binary array can be particularly advantageous. The foregoing is especially applicable to a vehicle having a plurality of motors such as electric motors or gas engines, with selective coupling of selected motors closely matching the running horsepower depending on the demands placed upon the vehicle. Such demands could be related to increased horsepower required for accelerating or passing, for ascending a steep grade, or for pulling varying loads. Decreases in demand may result by descending a grade, decreasing varying loads, decreasing wind resistance, or coasting to a stop. By having a plurality of motors installed into the vehicle, with the motors selectively sized according to a binary series, the demand horsepower may be accurately matched by the available motor capacity. Starting with a properly sized motor, having a relatively small horsepower output, many small step horsepower increments are possible. The motors can be selectively brought on-line in varying combinations matching the load. Moreover, by pulsing the same, even further efficiencies are possible.

A further benefit of the binary array of the present invention, especially in the case of electric motors, is that a transmission can be eliminated and replaced with merely the proper combination of motors necessary to the instantaneous horsepower demand. In effect, the present invention allows the full functional equivalent of a continuously variable transmission, with each of the motors operating at peak efficiency, without voltage "choppers."

Accordingly, it is an object of the present invention to provide a vehicle with substantial overall horsepower capacity, which can be run efficiently at a wide range of horsepower outputs when such overall capacity is not required, yet immediately response to increased horsepower output demands. By increasing the overall vehicle range, lowering component costs and eliminating other components and providing greater safety and comfort, the present invention is believed uniquely capable of obtaining consumer acceptance of electric vehicles.

It is a further object of the present invention to provide a vehicle which can be run efficiently at a wide range of horsepower output while reducing tailpipe emissions.

It is another object of the present invention to provide a motor control system that provides efficient operation through pulsed operation of the motors and driveline between a power phase and a coasting stage, while conserving the energy of the vehicle.

It is an additional object of the present invention to provide a motor control wherein the motor is run intermittently in a generally pulsing on/off fashion wherein the motors may be operated at or near full load with maximum efficiency during the "on" cycle, while inertia is utilized during the "off" cycle.

It is also an object of the present invention to provide a vehicle having a control system which can bring on-line additional motor capacity when required.

It is yet another object of the present invention to provide a vehicle control system that obtains greatly increased economies and extended driving ranges on a similar set of batteries as compared to conventionally powered vehicles.

It is still a further object of the present invention to provide a vehicle control system capable of employing a regenerative braking scheme to conserve energy during operation of the vehicle as well as effective anti-lock braking wherein the regenerative braking can be exercised in pulsing fashion to prevent. "locking up" of wheels and tires, especially on icy or slippery conditions.

It is a further object of the present invention to provide an efficient arrangement of multiple motors, which can utilize common systems.

It is an additional object of the present invention to provide an efficient arrangement of multiple motors, which can replace a continuously variable transmission.

It is still an added object of the present invention to provide an efficient arrangement of multiple motors, which can employ regenerative braking without excessive battery temperatures.

It is also an object of the present invention to provide a vehicle capable of hybridization with photoelectric cells.

It is yet another object of the present invention to provide a vehicle which utilizes a plurality of motors, but which can be operated in a smooth fashion while bringing various motors on-line or taking various motors off-line.

It is a still further object of the present invention to provide a vehicle with multiple motors which can idle while stationary in an efficient manner.

It is an additional object of the present invention to provide a vehicle control system having a multiple motor layout considering starting, motor sizing, and gear shifting linkage;

The forgoing objects are uniquely achieved through a control system for "pulsing" the vehicle drive source in an on/off fashion, whereby the vehicle's stored energy in the forward motion of its mass allows the vehicle to continue travel in the forward direction when the drive source is turned off. By alternating between the on and off state of the drive source, the vehicle will alternate between a tractive and coasting state between a range of acceptable pre-set maximum and minimum forward velocities. When combined with motors selected in a binary series, even further efficiencies can be obtained.

That is, in such a binary system, the smallest first motor has a most efficient or optimal horsepower rating, the next second motor has an optimal horsepower rating twice that of the smallest first motor, the next third motor has an optimal horsepower rating four times the smallest first motor, and a next larger fourth motor has an optimal horsepower rating eight times that of the smallest first motor, and so on. In most applications, two or three motors can be utilized, but larger transportation means could utilize a larger number of motors in this binary series.

In an internal combustion engine array, the smallest first engine is provided with a typical electric starter, while the larger engines can be started using the smaller first engine and for such larger engines no starter is required. Engine systems can be shared between the engines, including such auxiliary systems like fuel storage and delivery, induction, cooling, lubricating oil circulation, emission controls, exhaust, and electrical.

A controller monitors horsepower and torque throughout the drive train and thereupon selectively engage motors in strategic combinations matching the power demand as closely as possible. For example, in an internal combustion engine arrayed vehicle in an idling state, such as at a stop light, the smallest first engine only remains at idle, with the larger engines disengaged and shut off. A smooth running vehicle is provided in that the smallest first engine can run through a torque converter for automatic transmission of power, and the larger engines can be engaged by automatic mechanical clutches, activated by the controller. Efficiencies are also obtained through the selected combinations of engines where each engine is operated at or near optimal operating output. Further, not only is the present invention capable of obtaining efficiencies in terms of energy required, but exhaust emissions can also be effectively minimized.

BRIEF DESCRIPTION OF THE DRAWINGS

FIG. 4 is a graphical representation of range versus total pulse "off" time of an electric vehicle;

FIG. 5 is a graphical representation of the improvement of the pulsing system versus a constant output system;

FIG. 6 is a graphical representation of the improvement of pulsing system over constant output system regarding length of time of power distribution;

DETAILED DESCRIPTION OF THE PREFERRED EMBODIMENTS

Figure 1:
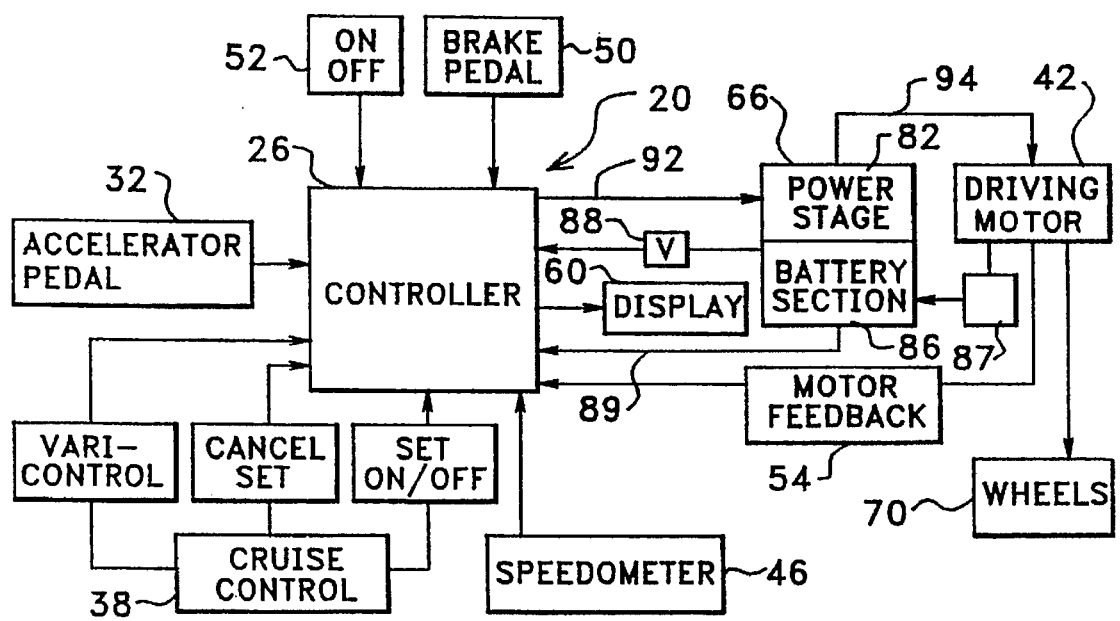
FIG. 1 is a schematic flow diagram of a pulsing vehicle drive system of the present invention.

FIG. 1 shows schematically an embodiment of the pulsing drive system 20 of the present invention. The system 20 combines a controller 26 (such as a microprocessor) receiving input signals from an accelerator foot control 32, a cruise control 38, a driving motor 42, a speedometer 46, a brake control 50, and a system engage/disengage control 52. The cruise control 38 can be a known voice activated unit. Additionally, the controller 26 receives motor feedback signals 54, such as motor speed and torque (in the case of an internal combustion engine or motor current in the case of an electric motor), and engine vital signals such as air flow, fuel flow, oxygen content in exhaust gases, EGR, coolant temperature, and oil pressure.

As noted above, the "driving motor" can be an electric motor or an internal combustion engine or any other power delivery means. The microprocessor 26 communicates output signals to a dashboard display 60 and to a means 66 for selectively communicating energy. The microprocessor 26, using a "varicontrol" program, calculates an appropriately constant or pulsed output signal based on the input signals (throttle position, desired set velocity, etc.). The "varicontrol" program determines the tractive and coast times depending on mean velocity and energy conservation modes selected. In should be noted that traffic conditions may prevent the vehicle velocity fluctuations inherent with maximum fuel economy.

The means 66 for selectively communicating energy controls fuel flow to the motor 42 by use of a fuel flow regulator (not shown) in the case of internal combustion engines or appropriate conditioned power in the case of electric motors. Alternatively, the means 66 can directly for selectively communicating energy control the transmission of power from the motor 42 to wheels 70, such as by controlled application of a clutch, as described below regarding FIG. 7. A battery 86 is charged through a charging control 87 from auxiliary power take-offs from the motor 42. The charging may be either continuous (as is customary) or only during braking as described below.

The battery 86 can be of conventional capacity when the motor 42 is an internal combustion engine. Whether the battery 86 has conventional capacity or substantial capacity in the case of electric motors, the battery 86 can provide power to the controller 26 through a voltage regulator 88. A current state of charge signal, or battery voltage 89, can be sent by the battery section 86 to the controller 26. Of course, through this configuration, and in the proper climates, a vehicle in accordance with the present invention can be combined with photoelectric (or solar) cells to supplement the electric charging capabilities.

When the motor 42 is an electric motor, the means 66 for selectively communicating energy comprises a power stage or switching means 82 and the battery 86 is of substantial-capacity, typically including a plurality of cells. The power stage 82 receives a selected pulsing signal 92 from the microprocessor and amplifies the signal to provide a power pulse 94 to the motor driving the vehicle. When regenerative braking is desired, the microprocessor 26 sends a braking signal to the means 66 for selectively communicating energy along with a modulated pulse and the motor/generator than generates power according to the pulse signal charging the batteries 86. Thus, the drag caused by the generator 42 can be pulsed or oscillated preventing lock-up of the wheels of the vehicle (i.e., the motor/generator 42 operates as an anti-lock braking system).

To verify the benefits of the foregoing, an embodiment of an aspect of the present invention (using only a single motor) is compared with a particular vehicle, "The Chrysler Electric TEVan," a prototype developed by Chrysler and the Electric Power Research Institute. The TEVan employs a battery pack including thirty (30) six volt modules, and the vehicle curb weight is approximately 6,000 pounds.

In the embodiment of an aspect of the present invention, a limousine is used as the model for the vehicle, with the vehicle mass also at about 6,000 pounds using sixteen (16) 12 volt batteries. The motor is mounted at a rear axle of the limousine, with the batteries 86 mounted at a position forward of the rear axle, but behind the front axle.

The results of a computer simulation of the pulsing drive system of the present invention, for initial vehicle velocities from 10 MPH to 90 MPH, are presented in Table 1. Table 1 is developed for a vehicle weighing 5915 lbm having a tire radius of 0.997 feet, a rolling resistance of 0.015 lbf/lbm and the constant velocity set at the mean velocity of the pulsing cycle for comparison. Initial velocity is measured in miles per hour, acceleration is measured in feet/sec$^2$, final velocity is measured in miles per hour, acceleration time is measured in seconds, efficiency of the motor is dimensionless, power used is measured in kilowatt-hours and is the power used by the pulsing motor, K1 and K2 are equation factors, coast time is measured in seconds, total time is measured in seconds, mean velocity of the pulsing vehicle is measured in miles per hour, range of the pulsing vehicle is measured in miles (assuming battery discharge to 100% of battery charge—increasing possible with full-discharge battery technology), resistance is measured in pounds, torque is measured in foot pounds, RPM represents revolutions per minute of the tires, Hp represents horsepower expended by a constant speed motor, "Eff 2" is the efficiency of the constant speed motor at various horsepower productions, power used is measured in kilowatthours and is the power used by a theoretical constant velocity vehicle at mean velocity, "range 2" is measured in miles and is the range achieved by a theoretical constant velocity vehicle at mean velocity, and percent improvement is the improvement regarding power use of the pulsing drive versus the constant velocity system at various initial velocities and final velocities. Table 1 is developed using a 35 Hp electric motor and 39 kwh of battery energy as the vehicle drive engine means. The equations used to develop Table 1 were derived from chapters of text "Mechanics of Vehicles".

Applicant has found that acceleration times of three to seven seconds, corresponding to reasonable acceleration magnitudes, results in maximum driving comfort between acceleration times and coast-down times. Applicant has also discovered that acceleration times of three to seven seconds, in conjunction with acceleration amplitudes of between 1.6 and 2.7 ft/sec$^2$, achieves pulsing drive having acceptable velocity variations during cruising. The results suggest that the greater the weight of the vehicle and the closer the mean velocity is to 90 MPH, the greater the potential for fuel economy. Also, the greater the velocity variations from initial velocity to final velocity during one pulsed acceleration-coast cycle, the greater the economy. It may only be practical during dense traffic conditions that the pulsing be rapid—the velocity variations being more slight—and the economy less than maximum. In these driving environments, a switch to steady power may be more practical. Note that energy recovery from regenerative braking is not included in the vehicle range set forth in Table 1. Thus, additional efficiencies are possible.

Figure 2:
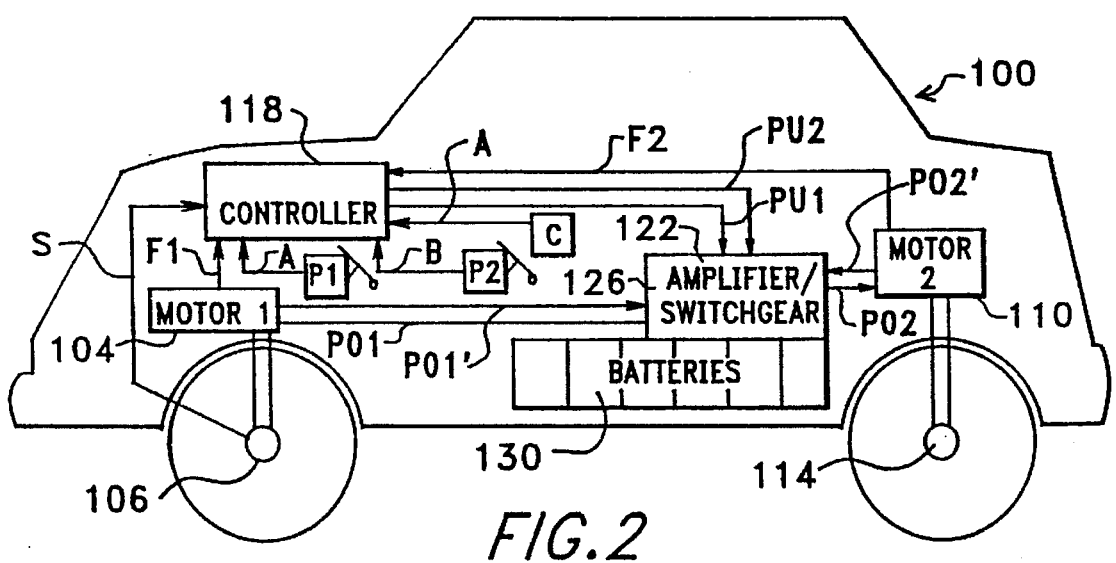
FIG. 2 is a schematic flow diagram of a pulsing drive system using dual motors.

FIG. 2 shows in schematic form an alternate embodiment of the vehicle 100 having a first motor 104 in mechanical power communication with a first driven axle of wheels 106, and a second motor 110 in mechanical power communication with a second driven axle of wheels 114. Mechanical power communication can be via a direct drive, an automatic transmission, a transaxle, a clutch actuated gearbox, a drive chain or any other method of transmitting rotational power. A controller 118 receives a velocity signal S from one of the two driven axle of wheels 106, 114. In FIG. 2, a signal from the first driven axle of wheels 106 is shown. The controller 118 also receives a first feedback signal F2 from the second motor 110. The feedback signals F1, F2 can be power signals, drag signals or motor operating parameter signals. The controller receives an acceleration signal A from either a foot pedal P1 or a cruise control C. A braking signal B is sent from a second pedal P2.

The controller 118 sends a first pulsing signal PU1 to a first switching means 122 (also referred to herein as an amplifier or switchgear, depending upon whether the motors 104, 110 are electric motors or internal combustion engines, respectively) and/or a second pulsing signal PU2 to a second switching means or amplifier/switchgear 126. The first and second switching means 122, 126 are in electrical communication with a battery pack 130. The controller 118 sends, along with the pulsing signals PU1, PU2, a carrier signal or similar means indicating to the switching means 122, 126 whether the pulsing signals PU1, PU2 are providing for acceleration or, alternatively, for regenerative braking. The first switching means 122 provides pulsing power PO1 to the first motor 104 and pulsing power PO2 to the second motor 110 selectively.

During regenerative braking, the first driven axle of wheels 106 and the second driven axle of wheels 114 spin the first motor 104 and the second motor 110, respectively, as electric power generators which produce power PO1', PO2' respectively. The generated power PO1', PO2' communicates with the battery pack 130 in a pulsing fashion controlled by the pulsing signals PU1, PU2 derived from the controller 118. In between pulses, the first motor 104 and the second motor 110 are effectively electrically disconnected (i.e., they are free-wheeling). During braking pulses, the first motor 104 and the second motor 110 act as electrical generators and thereby create a resistive torque against free rotation of the axle of wheels 106, 114. Thus, a pulsing-type drag is created at the first driven axle of wheels 106 and the second driven axle of wheels 114, selectively controlled by the controller 118.

Figure 3:
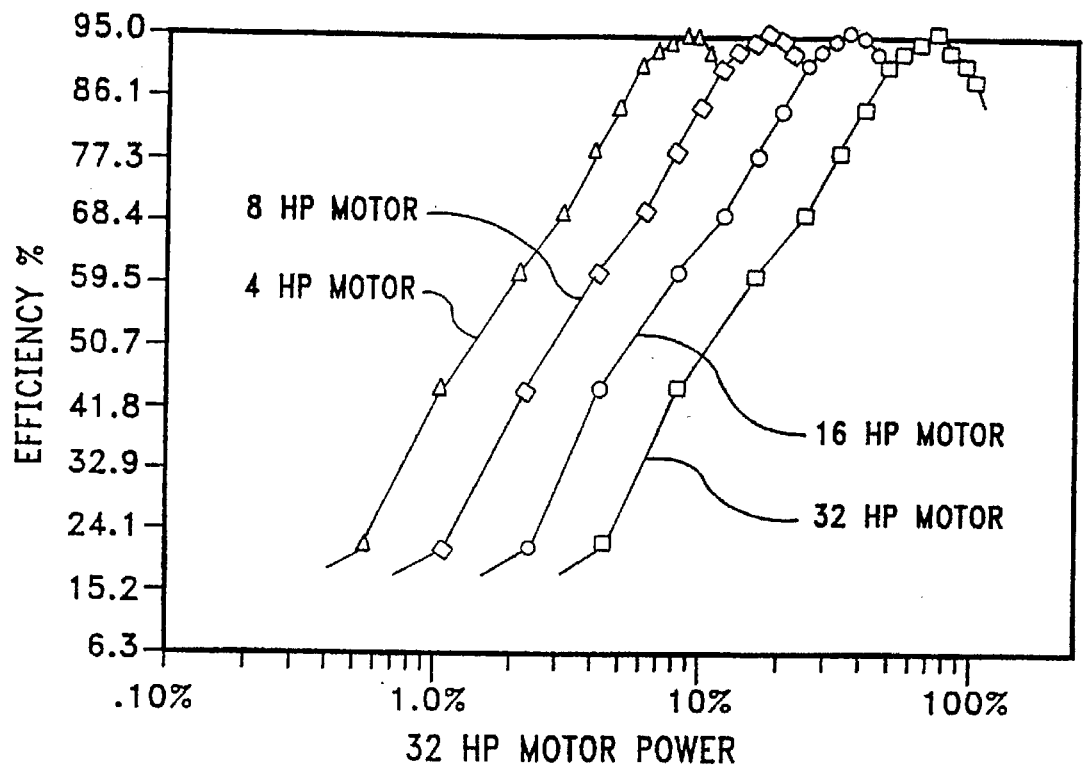
FIG. 3 is a semi-logarithmic graphical representation of motor efficiency versus percent load.

FIG. 3 demonstrates the scientific principles behind the pulsing aspect of the present invention.

As shown in FIG. 3, for a 32 Hp motor curve, a peak efficiency can be obtained proximate a single driven load on the motor. For the 32 Hp motor, a load of about 90–100% obtains an efficiency peak at about 95%. It is clear from FIG. 3 that operating the 32 Hp motor below this peak load of 90–100% will result in inefficient use of energy, as the efficiency drops considerably. Therefore, according to an aspect of the present invention, rather than match a load which falls below the highest motor efficiency load (i.e., a load of 40% corresponding to a base motor efficiency of near 78%), the motor is pulsed at or near its highest efficiency load. The result is intermittent vehicle acceleration, with the motor effectively disconnected from the vehicle drive wheels so that intermittent periods of coasting occur. Thus, during application of power to meet the desired load, the motor can be operated intermittently at its most efficient operating point.

FIG. 3 also shows three other motor curves: a 16 Hp motor curve, 8 Hp motor curve, and 4 Hp motor curve. It is immediately seen that the four curves correspond to a binary array, that is, $2^2$, $2^3$, $2^4$ and $2^5$, which is discussed in detail hereinbelow. FIG. 3 demonstrates that in addition to using a pulsing application of power through a single 32 Hp motor for peak operating efficiency, strategically sized additional motors can further optimize efficiency of the overall system. The abscissa of the graph of FIG. 3 shows 32 Hp motor power in percentage. Thus, 100% represents 32 Hp. The 16 Hp motor curve, the 8 Hp motor curve, and the 4 Hp motor curve are thus drawn on FIG. 3 respective of this power scale. Thus, with a multi-motor vehicle, especially one arranged in a binary array of sizing, additional flexibility is provided. Not only can the largest motor be intermittently pulsed to match required power to drive the vehicle, but different motors or combination of motors can be pulsed together or intermittently to maximize power delivered from the motors corresponding to higher motor efficiencies.

For example, bursts of power from the 32 Hp motor at a high efficiency value of around 29 Hp (near 95% efficiency) can be combined with or occur separately from 14 Hp bursts of power from the 16 Hp motor (corresponding to an efficiency around 95 % for the 16 Hp motor). Thus, a computerized controller could orchestrate pulsing from the binary array of motors to match the most efficient motors (as they operate near their peak efficiencies) with the horsepower demand caused by driving conditions. The unique sizing advantage of combining multiple engines or motors in a binary array is more fully discussed below.

FIG. 4 demonstrates the advantageous results of the present pulsing system. Presented are various starting velocities and total pulse "off" times within a minute unit and corresponding drive ranges for 39 kilowatt-hour of battery power up to 370 miles. This compares very favorably with the experimental vehicle by Chrysler TEVan, which proposes a range of 120 miles.

FIG. 5 also presents the expected advantages of the invention over a constant velocity powered vehicle. This chart shows an improvement in vehicle efficiency of up to 75% over such constant power vehicles.

FIG. 6 shows again a 75% improvement over constant speed powered vehicles, this graph showing the relationship regarding cyclic length of time during which power is applied and coasting is employed.

The results of a further computer simulation of the pulsing drive system of the present invention, for initial vehicle velocities from 10 MPH to 55 MPH, are presented in Table 2. Table 2 relates to a vehicle weighing 40,000 lbm (i.e., representative of school bus) having a tire radius of 1.667 feet, a rolling resistance of 0.015 lbf/lbm and a variable velocity normalized as a mean velocity. The pulsing system of the present invention is also compared to steady state operation. As in Table 1, nominal initial velocity is measured in miles per hour, acceleration is measured in feet/sec$^2$, final velocity is measured in miles per hour, acceleration time is measured in seconds, efficiency of the motor is dimensionless, power used is measured in kilowatt-hours and is the power used by the pulsing motor, K1 and K2 are equation factors, coast time is measured in seconds, total time is measured in seconds, mean velocity of the pulsing vehicle is measured in miles per hour, range of the pulsing vehicle is measured in miles (again to full battery discharge), resistance is measured in pounds, torque is measured in foot pounds, RPM represents revolutions per minute of the tires, Hp represents horsepower expended by a constant speed motor, "Eft" is the efficiency of the constant speed motor at various horsepower productions, power used is measured in kilowatt-hours and is the power used by a theoretical constant velocity vehicle at mean velocity, "range 2" is measured in miles and is the range achieved by a theoretical constant velocity vehicle at mean velocity, and percent improvement is the improvement regarding power use of the pulsing drive versus the constant velocity system at various initial velocities and final velocities. Again, energy recovery from regenerative braking is not included in the vehicle range set forth in Table 2.

Table 2 is developed using a binary array of 8, 16, 32, 64 and 128 Hp electric motors (as shown schematically in FIG. 7a and as discussed in further detail below) and 200 kw-hour of battery energy as the vehicle drive motor means. The equations used to develop Table 2 were also derived from chapters of text "Mechanics of Vehicles".

As Table 2 demonstrates, significant improvements can be obtained in very heavy vehicles by also varying acceleration times, shown between three to seven seconds. Corresponding acceleration magnitudes is generally below 0.1 g (i.e., 3.249 ft/sec$^2$), which as noted above results in maximum driving comfort between acceleration times and coast-down times, with 0.15 g considered the upper acceptable limit. The selection of acceleration times between three to seven seconds is made in accordance with the control system of FIG. 16, discussed in more detail below, through the selection of a "performance" versus an "economy" drive mode.

The results further suggest that the greater the weight of the vehicle and the greater the mean velocity, the greater the potential for fuel economy. Also, the greater the velocity variations from initial velocity to final velocity during one pulsed acceleration-coast cycle, the greater the economy. Moreover, coupled with regenerative braking, vehicle inertia can be used to the battery stores, such as batteries 130 shown in FIG. 2, for additional efficiencies. It is anticipated that the pulsing feature of the present invention is primarily applicable to rolling stock, and not necessarily to drawbar applications. For example, a tractor/plow configuration would not likely be able to employ this feature, as all forward momentum from the vehicle inertia would be counteracted by the drag of the plow.

Figure 7A:
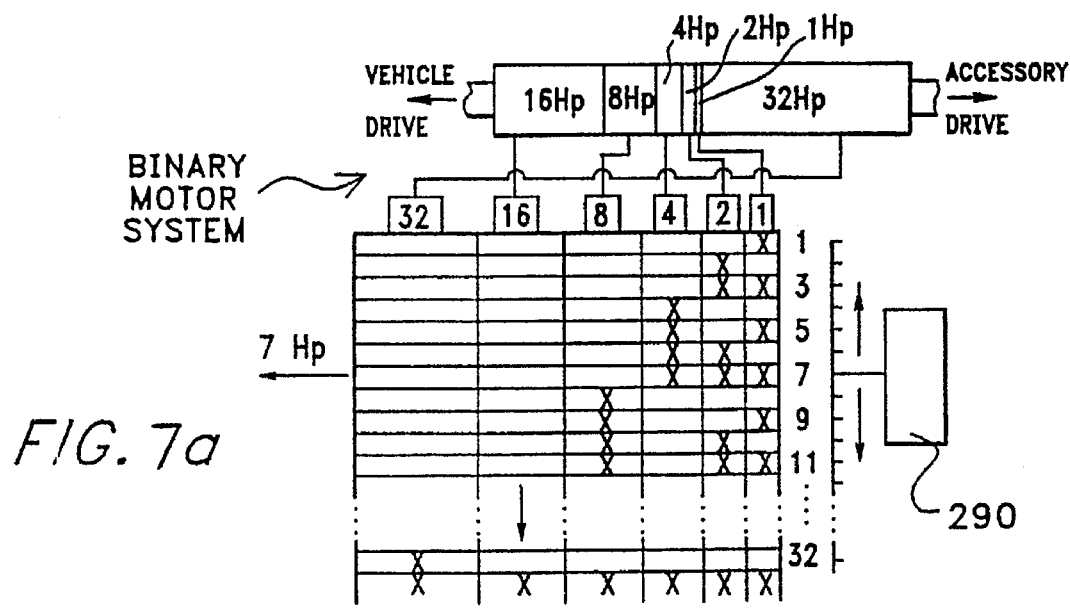
FIG. 7a is graphical representation of a binary array of 8, 16, 32, 64 and 128 Hp electric motors and switching logic for the same.
Figure 7B:
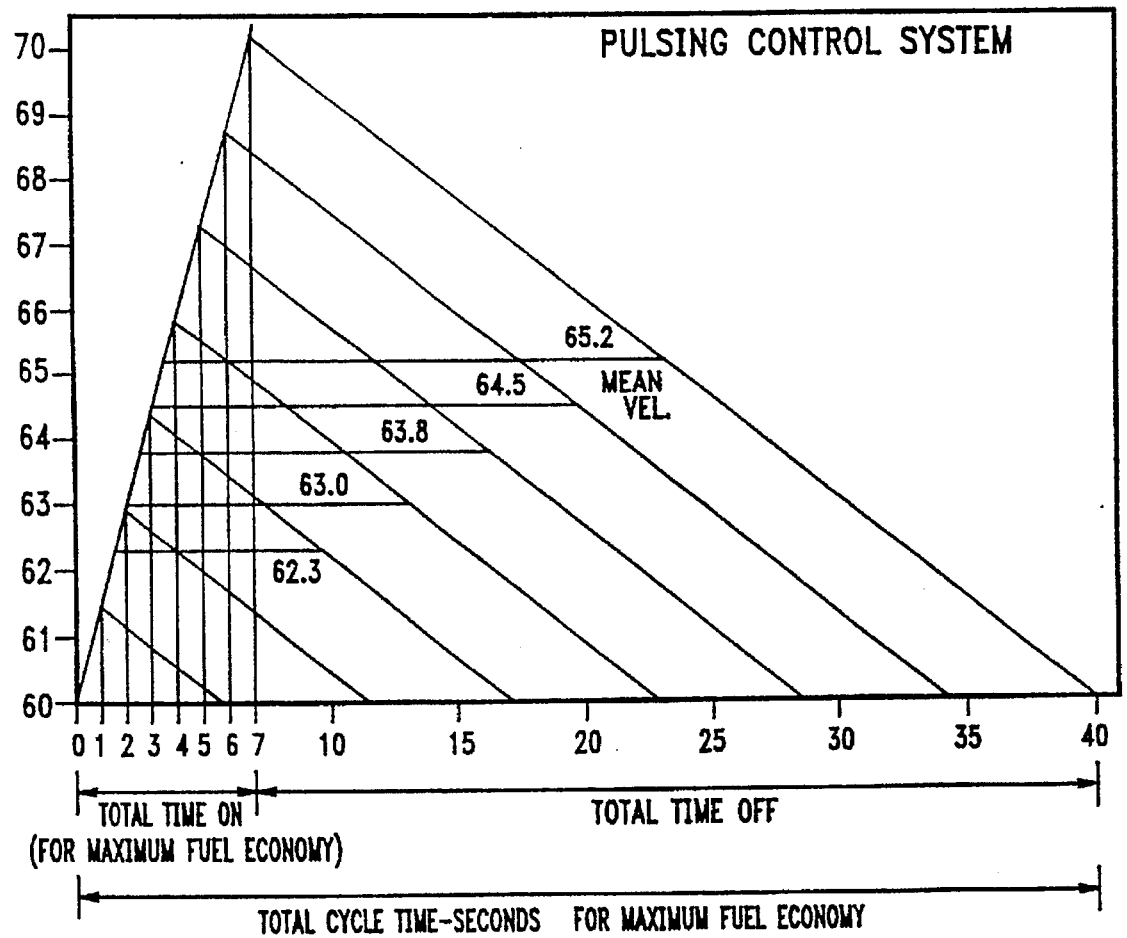
FIG. 7b is a graphical representation of the effect of pulse "on" time to total cycle time for maximum efficiency and mean vehicle velocity.

FIG. 7b presents the effect of the pulse time "on" and "off" and the total cycle time of the pulse for maximum efficiency and the effect on vehicle velocity for the vehicle configuration set forth in Table 2. As shown, for example, a total acceleration time of 7 seconds (for maximum efficiency) corresponds to a total pulse time of about 40 seconds. A corresponding mean vehicle velocity of 65.2 MPH is obtained. At an acceleration time of 3 seconds, the corresponding total pulse cycle time is reduced to about 17 seconds, with a mean vehicle velocity of 62.3 MPH.

Figure 8:
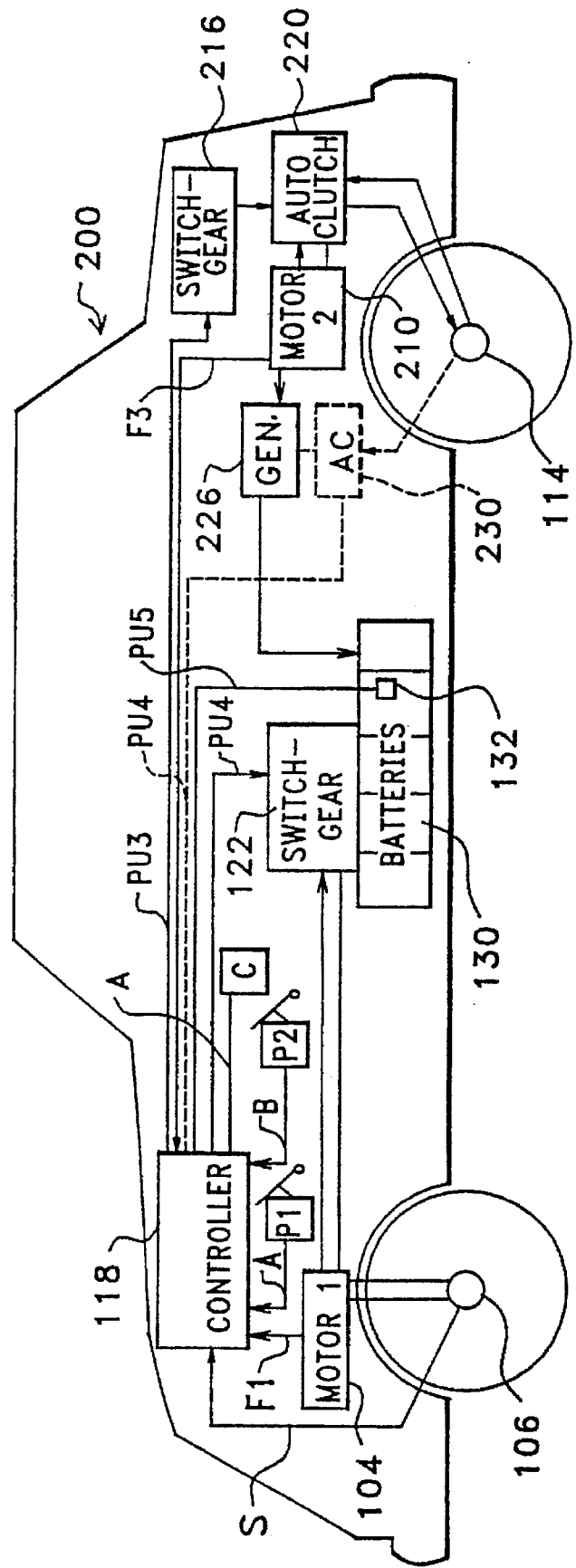
FIG. 8 is a schematic diagram of an alternate embodiment of the system using one internal combustion engine and one electric motor.

FIG. 8 shows an alternate embodiment of a twin motor vehicle, wherein a front drive train portion of the vehicle is similar to that shown in FIG. 2. That is, a first electric motor 104 drives a first driven axle of wheels 106. The controller 118 receives the signals S, F1, A, B, as described previously.

However, at the rear drive train portion of the vehicle 200, the second electric motor 110 is replaced with an internal combustion engine 210. As FIG. 8 is schematic only, the relative orientation, front or back, of the electric motor or the internal combustion engine is arbitrarily shown. Moreover, the present invention encompasses multiple internal combustion engines or other drive means arranged in a vehicle.

The internal combustion engine 210 is in mechanical rotational power communication with the second driven axle of wheels 114. The engine 210 provides a feedback signal F3 to the controller 118. The controller 118 provides a pulsed signal PU3 according to driving demands to a switchgear switching means or 216, which in turn communicates a correspondingly conditioned electric signal to an auto-clutch device 220 for selectively engaging or disengaging the engine 210 from the second driven axle of wheels 114. When the auto-clutch device 220 is in a disengaged mode, the engine can idle or free-wheel using minimal fuel. The engine 210 can also drive a generator 226 recharging the batteries 130.

The engine 210 can also be used as a braking means. This is a known technique for braking wherein the pumping resistance through the induction and exhaust systems of an internal combustion engine slows down a vehicle (i.e., during downshifting). The auto-clutch 220 remains in the engaged mode, with no fuel delivery to the engine, creating an engine drag through the repeated compression occurring in the cylinders of the engine, as well as normal engine friction, inducing a drag on the second driven axle of wheels 114. Thus, the signal PU3 is identified as a braking signal and can be either a constant or a pulsed signal during braking. A pulsed signal creates a pulsed braking effect.

The generator 226 also absorbs a portion of the energy dissipated in regenerative braking and this energy can recharge the batteries 130. Alternatively, a second auto-clutch 230 can be provided between the generator 226 and the second driven axle of wheels 114. A signal PU4 from the controller to the second auto-clutch 230 mechanically engages or disengages the second axle of wheels 114 with the generator 226 utilizing the generator 226 in an alternate mode as a regenerative braking device. Thus, spinning the generator 226 under an electric load recharges the batteries 130, and also creates a retarding torque on the second axle of wheels 114. The signal PU4 can also be a pulsed signal creating a pulsed braking effect. Thus, the same generator 226 can be a constant source of recharging of the batteries during the engine operating times and/or can be used as a means of regenerative braking.

A further aspect of the present invention is further uniquely obtained through the pulsing system disclosed herein. As also shown in FIG. 8, a thermocouple 132 is attached to the batteries 130. During regenerative braking, either through the generator 226 or directly from the motor 104, charging the batteries 130 tends to increase the temperature within the batteries 130. If enough energy is directed to the batteries, this temperature increase can cause damage to the batteries 130. A desirable feature is the ability to obtain a signal PU5 from the thermocouple 132 for use by the controller 118. Based on the sensed temperature of the batteries 130 during regenerative braking, the controller 118 can modify the pulsing of energy to the batteries 130 through the switchgear 122 or 216 to reduce the pulse time or frequency of battery recharging, or terminate such recharging completely, if the temperature strays to unacceptably high levels.

Figure 9:
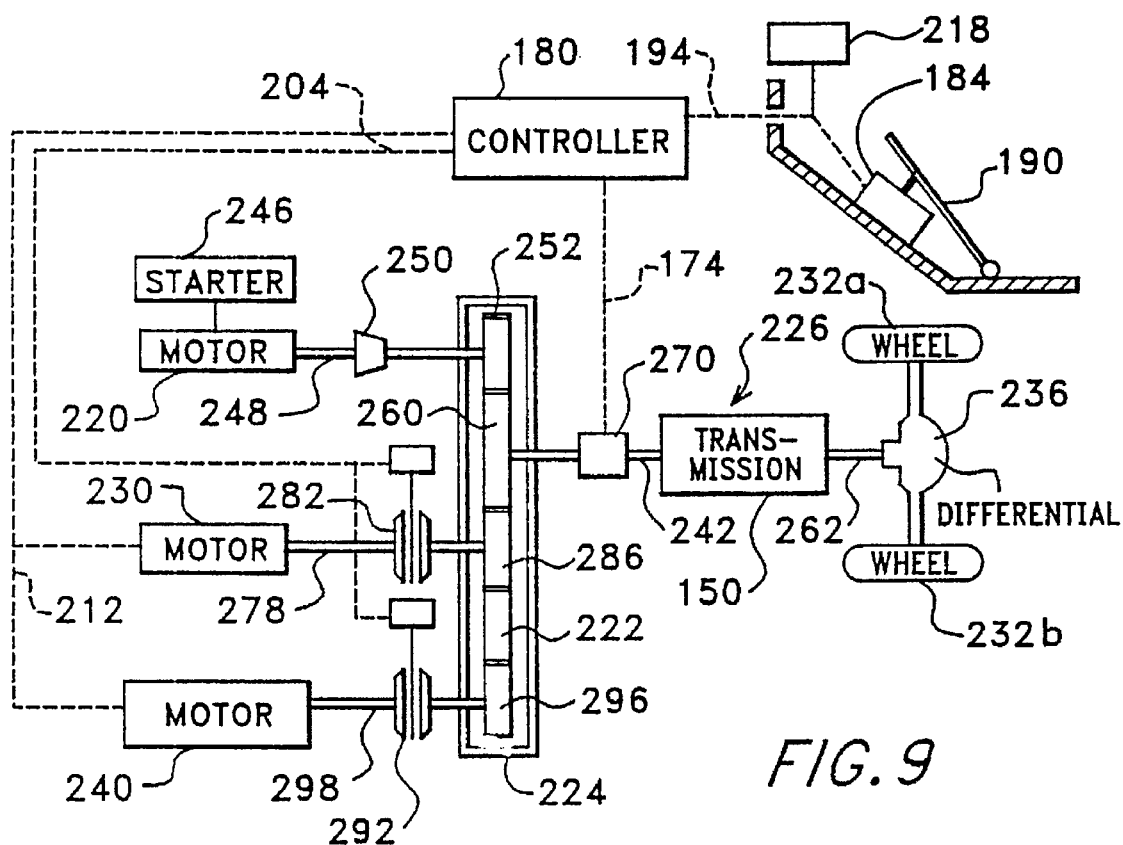
FIG. 9 shows a schematic diagram of a vehicle drive system utilizing three motors.

As noted previously, relative FIG. 3, an aspect of the present invention is the application of a strategically sized binary array of motors. FIG. 9 shows a schematic representation of such a vehicle, utilizing three motors. A first motor 220 is the smallest of the three motors producing an optimal horsepower of "x" horsepower. A second motor 230 is sized to produce an optimal horsepower equal to twice that of the first motor 220, a horsepower value of 2×. A third motor 240 is sized to produce an optimal horsepower twice that of the second motor 230, or 4×. Additional motors could also be arranged following this same binary series having horsepower values 8×, 16×, 32×, etc. The first motor 220 is provided with a starter 246 if the motors comprise gas or internal combustion engines, which can be a typical engine starter as now found in most automobiles. The first motor 220 communicates power through a shaft 248 to a torque converter 250, which transmits power to a first gear 252. The first gear 252 transmits mechanical power by meshing with a drive gear 260.

The second motor 230 transmits rotational power via a second shaft 278 through a first auto clutch 282 to a second gear 286.

The third motor 240 transmits power via a third shaft 298 through a second auto clutch 292 to a third gear 296. The second gear 286 and the third gear 296 are in mesh with a idler gear 222 which synchronizes rotation between the second gear 286 and the third gear 296. The second gear 286 is in mesh on an opposite side of the idler gear 222 with the drive gear 260. The first gear 252, drive gear 260, second gear 286, idler gear 222, and the third gear 296 are shown schematically boxed as a gear box 224. The gear box 224 represents a means engaging the three motors 220, 230, 240 and synchronizing their rotations (i.e., all motors rotate in the same direction). More sophisticated type gear boxes can also be easily envisioned with appropriate gears appropriately sized to take optimum mechanical advantage of the motor sizing and rotations. Such gear boxes are encompassed by the present invention.

The drive gear 260 communicates rotational power through a drive train 226 to a pair of drive wheels 232a, 232b. The drive wheels 232a, 232b are rotatably engaged by a differential 236 as is known in the art. The driver 260 communicates rotational mechanical power to a input shaft 242 to a transmission 150 through a drive shaft 262 to the differential 236. A torque sensor 270 mounted into the input shaft 242 produces a torque and speed signal communicated through a highway 174 to a controller 180. A torque and speed sensor, such as disclosed in U.S. Pat. No. 4,306,462, could be used. The controller 180 receives a demand signal from a transmitter, 184, which itself receives a transitional signal from an accelerator pedal 190 moved by a driver's foot. The transmitter 184 communicates over a second highway 194 to the controller 180. The controller 180 receives the inputs from the highways 174, 194 and selectively engages the second motor 230 or the third motor 240, or neither, or both. The controller 180 sends an appropriate signal through the third highway 204 to the first auto clutch 282 and the second auto clutch 292. The auto clutches 282, 292 are similar to a typical mechanical clutch except are automatically activated by an input signal rather than by a driver's toot on a clutch pedal.

In operation, if the controller 180 determines that an appropriate motor capacity for a particular demand load is the combination of the first motor 220 and the second motor 230, the controller 180 activates the first auto clutch 282 to an engagement condition and mechanically locks the second motor 230 to the second gear 286. The rotating drive gear 260 turns the second gear 286, which turns the second motor 230 in preparation to start the second motor 230 (i.e., the second gear 286 acts as a starter motor for the second motor 230 when the second motor 230 is a gas engine). A simultaneous start signal is transmitted from the controller 180 through a fourth highway 212 to the second motor 230 in preparation for starting the second motor 230. Once the second motor 230 is started, the second motor 230 will produce power transmitted to the second gear 286, assisting the drive of the drive gear 260. Thus, it is plainly clear that a second starter is not needed for the second motor 230 or the third motor 240, if the third motor 240 is also an internal combustion engine, to start those motors 230, 240.

A further benefit of the foregoing system is the ability of a binary array of electric motors to replace a continuously variable transmission with the proper combination of motors necessary to the instantaneous horsepower demands without using voltage "choppers" to limit the motor output. In effect, the present invention allows the full functional equivalent of a continuously variable transmission, with each of the motors operating at peak efficiency. Thus, if avoiding the expense and complexity of such a transmission is desirable, the present invention can be applied to do so.

Figure 13:
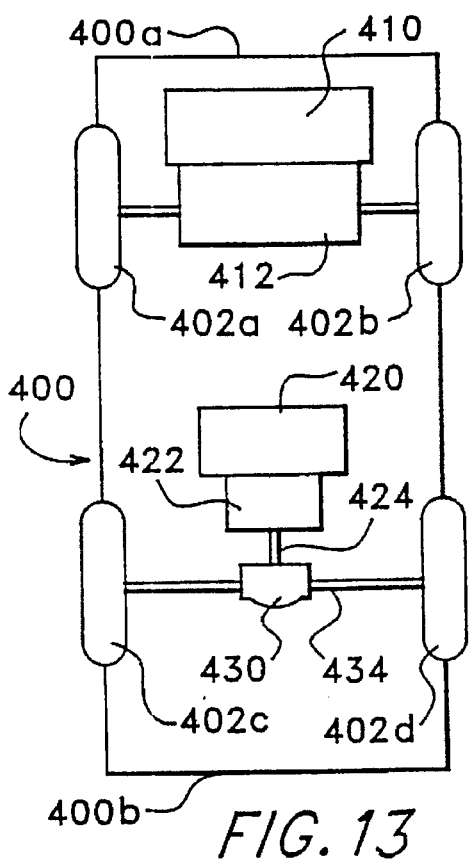
FIG. 13 is a schematic plan drawing of a vehicular embodiment of the invention.
Figure 14:
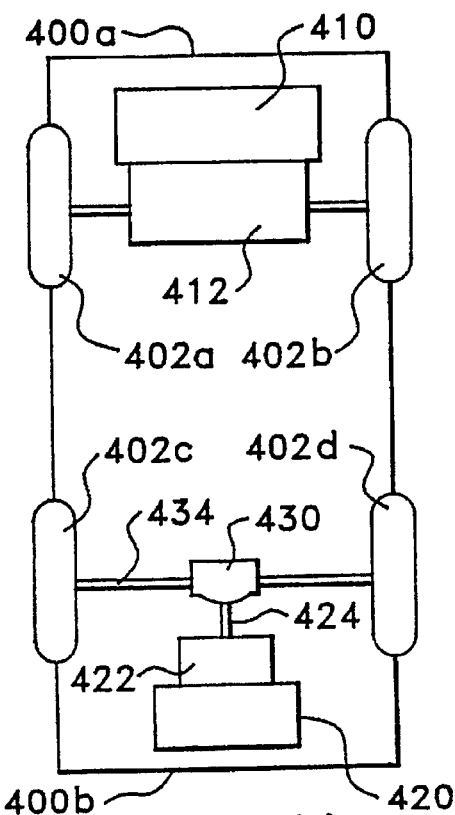
FIG. 14 is a schematic plan drawing of another vehicular embodiment of the invention.
Figure 15:
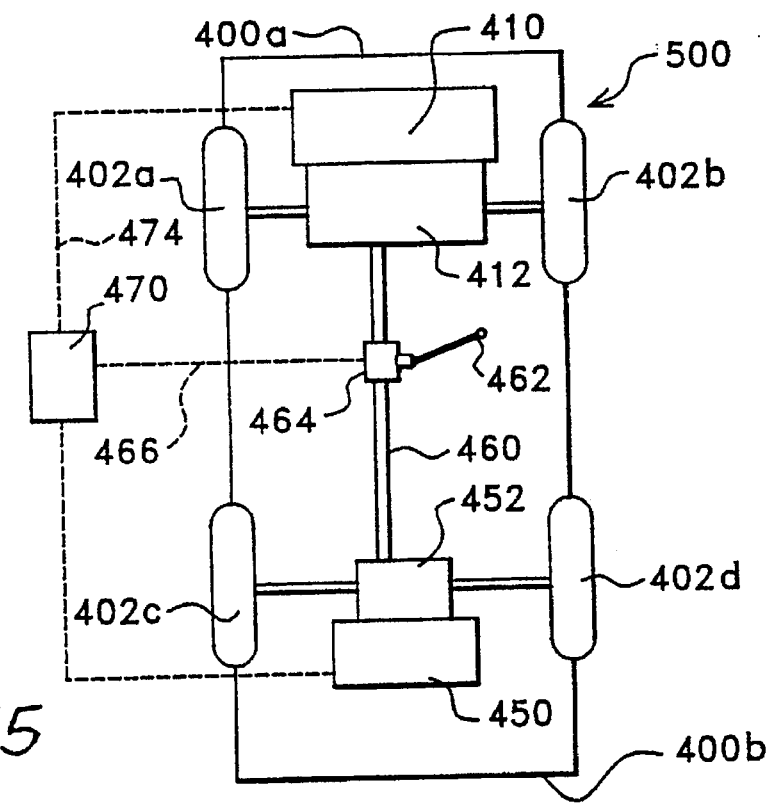
FIG. 15 is a schematic plan drawing of a still additional vehicular embodiment of the invention.

A multi-motor vehicle can be arranged as shown in FIGS. 13–15 in a "four wheel drive" arrangement with one motor driving the front wheels and a second motor driving the rear wheels. One motor, the smaller, normally operates under reduced loads and the second motor automatically by the controller) comes on-line as needed. Under certain conditions, it may be desirable to override the controller keeping both motors running or four wheel drive, such as during slippery conditions. An override control 218, referencing FIG. 9, manually locks in both motors, or any combination of motors.

Figure 10:
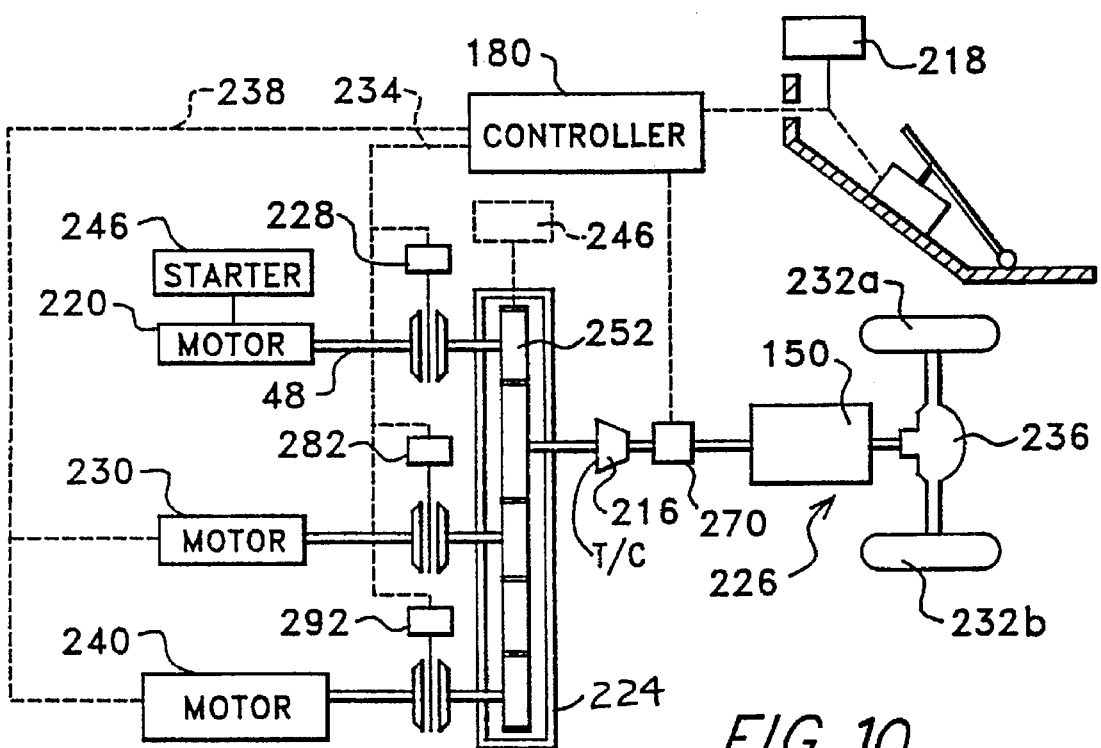
FIG. 10 shows an alternate schematic diagram of a vehicle drive system utilizing three motors.

Another schematic arrangement of a multiple motor arrayed vehicle is shown in FIG. 10. In this arrangement, a torque converter 216 is located in the drive train 226, between the sensor 270 and the transmission 150. Thus, the torque converter 216 receives rotational mechanical power from a selected combination of motors rather than just the first motor 220. The first motor 220 now transmits rotational power through a third auto clutch 228. The controller 180 now communicates through modified third highway 234 to the first auto clutch 282, the second auto clutch 292, and the third auto clutch 228. The modified fourth highway communicates an ignition or start signal to the first motor 220, the second motor 230, and the third motor 240. A starter could be provided for each of the three motors (as gas engines or internal combustion engines), but for economizing hardware, the starter 246 is utilized on the smallest motor 220 only. Thus, when the vehicle is initially activated, the first motor 220 must be started first. Thereafter, the first motor 220 can be disengaged depending upon the combination of motors required. Thus, the second motor 230 and the third motor 240 could be run together or separately without the first motor 220 running. Any combination of the three motors can be run, and run through the torque converter 216 for smooth operation.

Alternatively, the starter 246 (shown dashed) could be located to engage the gearbox 224 such as at the first gear 252. Thus, the gears are driven directly and a selected auto clutch 282, 292,228 activated starting the associated motors 220, 230, 240.

Figure 11:
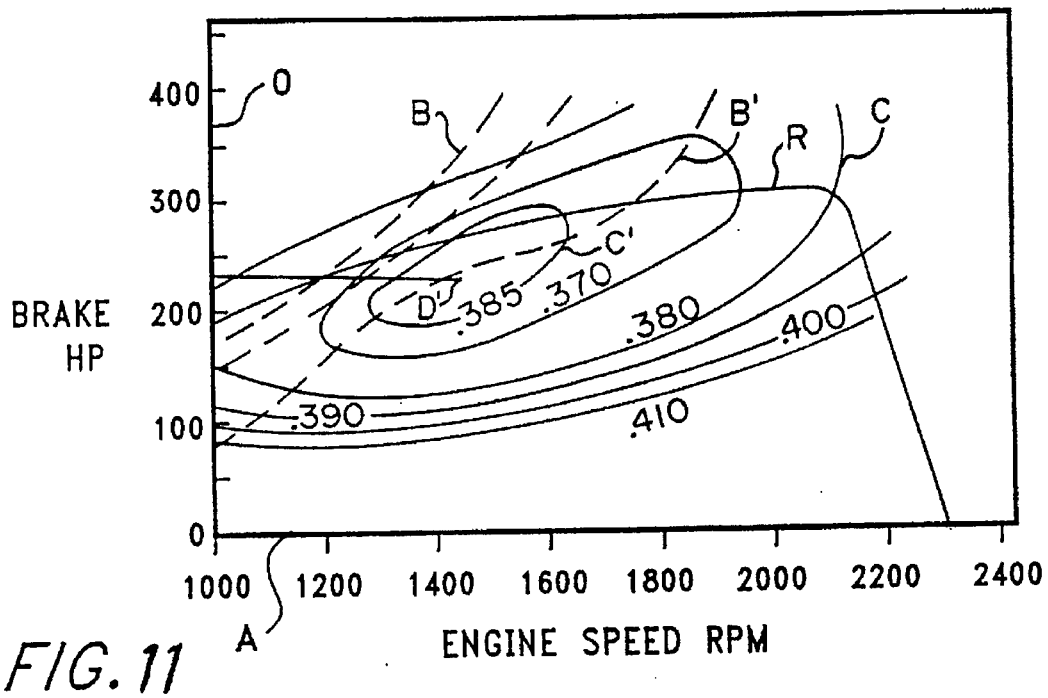
FIG. 11 is a graph showing a typical fuel map including power curve and emissions curves for a particular diesel engine.
Figure 12:
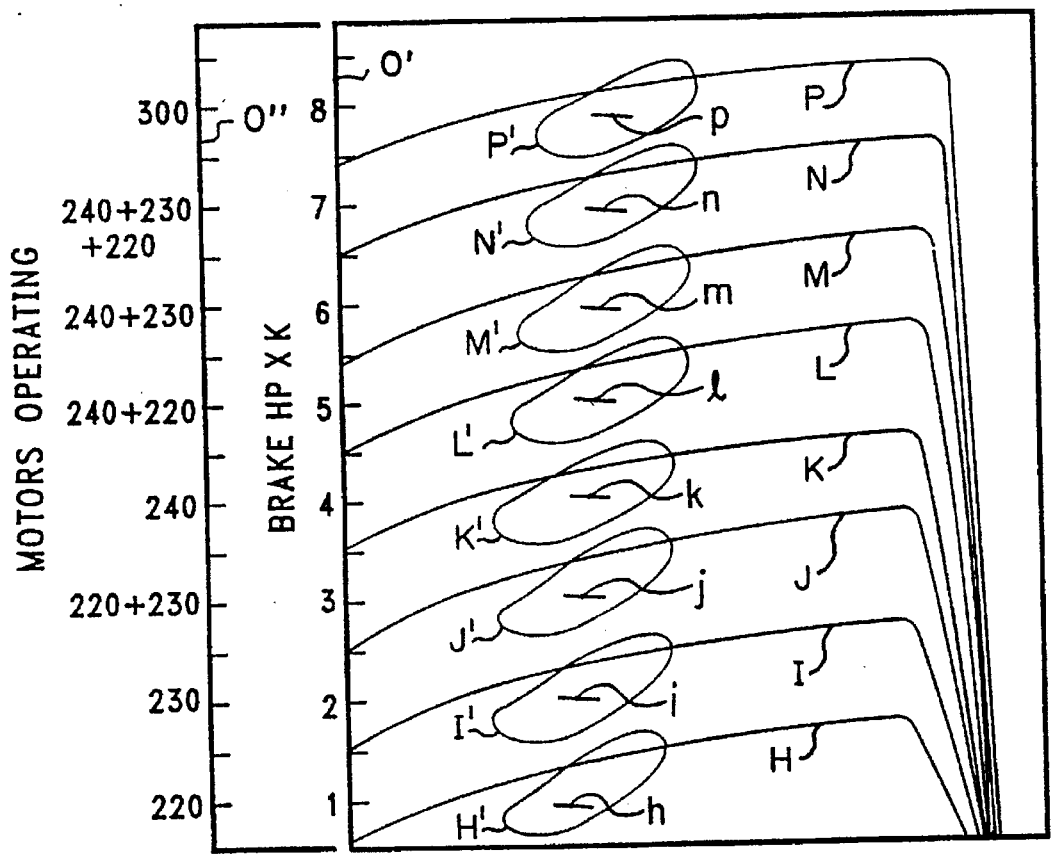
FIG. 12 is a graph showing power curves for various motors and combination of motors, including optimal operating envelopes for each motor and combination of motors.

FIGS. 11 and 12 show how in theory the binary array of motors (here internal combustion engines) assist vehicle efficiency and reduce vehicle emissions. FIG. 11 shows a typical fuel map for heavy-duty diesel engine developed for truck use. The ordinate O shows an increasing scale of brake horsepower. The abscissa A shows an increasing scale of engine speed in revolutions per minute (RPM). A maximum load curve R describes this particular engine with a maximum horsepower of 325 Hp at 2100 RPM. Dashed curves B indicate varying levels of exhaust smoke opacity. Lines of constant brake specific fuel consumption (BSFC) C, usually in units of pounds/horsepower hour are, as shown as, in some cases concentric rings with the lowest BSFC value near a center of the concentric rings. A center concentric ring C' with a BSFC value of 0.365 represents an optimal operating envelope for fuel efficiency. The operating envelope, of course, must be below the maximum load curve R for operability. Although this optimal envelope C' represents a range of brake horsepowers and a range of engine speeds, for ease of discussion we will identify an optimal operating point D' located centrally in the optimal operating envelope C'.

It is important to note that the minimum BSFC represents maximum fuel efficiency and also corresponds to reduced emissions as indicated by the minimum opacity curve B' residing inside the optimal operating envelope C'. The optimal operating point D' thus represents for this particular engine of FIG. 11 a brake horsepower of approximately 225 Hp corresponding to an engine speed of 1430 RPM.

Although proper transmission gear shifts can somewhat maintain a vehicle within or near its optimal operating envelope, when the horsepower load drops too low, gearing will not bring the engine into its optimal operating envelope. For example, in FIG. 11, if the brake horsepower drops below approximately 175 Hp, no engine speed shown will bring operation into the optimal operating envelope C'. Thus, for these low horsepowers, the particular engine described in FIG. 11 is oversized.

In describing an ideal binary array of motors, the first motor 220 has a first horsepower value for that motor of 1. The second motor 230 is selected having a second horsepower value of 2. The third motor 240 has a third horsepower value of 4 and a fourth motor 300 has a fourth horsepower value 8. This provides one Hp increments between a 1 to 15 Hp operating range with only four motors. The binary array, of course, could go to infinity depending on the application. It is conceivable that for a large transportation vehicle such as a locomotive train, many motors could be used. The above listed first, second, third and fourth horsepower values represent optimal operating points located centrally inside optimal operating envelopes such as described regarding FIG. 11, tier the selectively sized motors.

FIG. 12 shows on a first ordinate 0' an increasing scale of brake horsepower values representing demand horsepower on the vehicle. A second ordinate 0" shows which of the aforementioned motors, selectively combined, are running at their respective optimal operating points closely matching the brake horsepower values. An abscissa A' is shown with an increasing scale of motor speed and RPM's. FIG. 12 shown maximum horsepower curves for a binary array using four engines including selective combinations of the four motors. FIG. 12 also shows the optimal operating envelopes of each motor and selective combination of motors. It has been assumed, simplifying discussion, that the four motors have optimal operating envelopes within the same motor speed range or RPM range. This assumption is probably unrealistic but even if overly simplistic, does not detract from the spirit of the invention. If an operating envelope was shifted to the fight or left of the motor speeds shown, such could be compensated for with selective gearing in the gear box 224 and/or selectable gear selection in the transmission 150.

FIG. 12 thus shows a family of curves describing the binary array and selected combinations of motors put on-line. A first power curve H with a corresponding first optimal envelope H' and a corresponding first optimal operating point h, corresponds to a selectively sized first motor 220 operating at h having a horsepower value of 1.

A second power curve I with a corresponding second optimal envelope I' and a corresponding first optimal operating point i, corresponds to a selectively sized second motor 230 operating at i having a horsepower value of 2.

A third power curve J with a corresponding third optimal envelope J' and a corresponding third optimal operating point j, corresponds to a combination of first motor 220 and second motor 230 operating at h and i respectively and having a combined horsepower value of 3.

A fourth power curve K with a corresponding fourth optimal envelope K' and a corresponding fourth optimal operating point k, corresponds to a selectively sized third motor 240 operating at k having a horsepower value of 4.

A fifth power curve L with a corresponding fifth optimal envelope L' and a corresponding fifth optimal operating point 1 corresponds to a combination of first motor 220 and third motor 240 operating at h and k respectively and having a combined horsepower value of 5.

A sixth power curve M with a corresponding sixth optimal envelope M' and a corresponding sixth optimal operating point m, corresponds to a combination of second motor 230 and third motor 240 operating at h and k respectively and having a combined horsepower value of 6.

A seventh power curve N with a corresponding seventh optimal envelope N' and a corresponding seventh optimal operating point n corresponds to a combination of first motor 220 and second motor 230 and third motor 40 operating at h, i and k respectively and having a combined horsepower value of 7.

An eighth power curve P with a corresponding eighth optimal envelope P' and a corresponding eighth optimal operating point p, corresponds to a selectively sized fourth motor 300 operating at p having a horsepower value of 8.

It should be noted that the horsepower values 1 through 8 are arbitrarily selected and can be converted to a real-life system of units by multiplying each number by a constant K. For example, K could equal 110 Hp and the resulting binary array of motors is 110 Hp, 220 Hp, 440 Hp, 880 Hp, etc. For simplicity, only the unitary values are discussed.

Of course, other motor arrangements can be conceived. In FIG. 7a, an arrangement of motor combinations of 1, 2, 4, 8, 16 and 32 Hp and a sliding or rotational switch 290 is shown. The switch 290 has multiple contacts selected by a linear potentiometer or stepper motor and by sequential motion along a continuous linear or rotational path can obtain incremental and sequential motor horsepower increases or decreases. Such, as noted elsewhere herein, can provide for generally infinite power output, at peak efficiencies, without the need for a continuously variable transmission.

FIG. 12 shows that throughout a wide range of brake horsepower or demand horsepower of the vehicle, the binary array provides the flexibility to combine motors to keep operating motors at or near their optimal operating envelope H', I', J', K', L', M', N', and P'. In FIG. 11, it is demonstrated that for a single motor, operation within the optimal operating envelope C' occurs only in a relatively narrow brake horsepower range, say between 175 and 275 horsepower. The optimal horsepower operating range C' is chosen, as shown in the chart, at 0.365 BSFC. A more optimal operating range, an envelope drawing concentrically inside the 0.365 BSFC envelope, with a value below 0.365 could be defined over an even more narrow corresponding horsepower range, which further obtains increased efficiency over a broader range of the binary array shown in FIG. 12.

As discussed respective FIG. 11, optimal horsepower operating envelopes generally correspond to minimum tailpipe emissions. Therefore, by utilizing the binary array as described in FIG. 12, minimum emissions are generated throughout the entire range because each motor, alone and in selected combination, is operating near a minimum emission rate. Thus, the invention both increases fuel efficiency and decreases emissions from the vehicle.

Electric motors in lieu of internal combustion engines also each have a most efficient horsepower operating region corresponding to a particular motor size and could also be selected according to a binary array of such regions.

FIG. 13 shows an embodiment of this aspect of the invention wherein two motors power a motor vehicle, such as an automobile, in a "four wheel drive" configuration. A vehicle 400 is shown having four wheels, front wheels, 402a, 402b, and rear wheels 402c, 402d. A front of the vehicle 400 is indicated at 400a and a respective back indicated at 400b. The vehicle is powered at the front wheels 402a, 402b by a first motor 410 coupled to a front wheel drive transaxle 412, which drives the front wheels 402a, 402b in steerable fashion. This is commonly known as a "front wheel drive" arrangement.

A second motor 420 is mated to a "rear wheel drive" type transmission 422 which communicates power to a drive shaft 424 which communicates the power to a differential 430, which drives an axle 422, which drives at least one rear wheel 402c, 402d. The transmission 422 can have a torque converter (not shown) or a mechanical friction clutch (not shown) included.

Typically, the first motor 410 is transversely mounted under a hood (not shown), and the second motor 420 is arranged either in a "mid-engine" configuration, as shown in FIG. 13, or a "rear-engine" configuration, as shown in a vehicle 440 of FIG. 14. Since more room is typically available under the hood, the first motor 410 has an optimal brake horsepower output equal to twice that the second motor 420. Since generally the optimal operating horsepower point increases with increase motor size, it is expected that the first motor 410 is larger than the second motor 420. However, especially with the popular use of turbocharging, supercharging, and multiple valves per cylinder, even a small motor can have increased horsepower. Thus, this orientation of large motor up front and smaller motor in the rear is not a necessary orientation.

FIG. 15 shows another embodiment of a two-motored vehicle wherein a second motor 450 is coupled to a second transaxle 452, which drives the rear wheels 402c, 402d in steerable fashion. In this arrangement, the two-motored vehicle 500 is provided with "four wheel steering" and "four wheel drive." The motors 410, 450 are sized such that one of the motors 410,450 has an optimal operating horsepower point twice that of the respective other motor 410, 450. As discussed above, it is anticipated that more room would be available under the hood so that the first motor 410 would have twice the optimal operating horsepower than that of the second motor 450.

The configurations described in FIG. 13 through FIG. 15 correspond to the family of curves H, I, and J with corresponding envelopes H', I', and J', with corresponding optimal operating points h, i, j.

Where the transaxles 412, 450 or the transaxle 412 and the transmission 422 are driven by a torque-converter such as in an automatic transmission, the two-motored vehicles 400, 440, 500 can use the ground itself on the front wheels 402a, 402b and the rear wheels 402c, 402d, coupling the driven rotation of the front wheels and the back wheels (i.e., insuring that the front wheels and back wheels rotate at the same rotational speed). Such a system is disclosed in the magazine article "Synchronicity" by Don Sherman, *Car and Driver* Magazine, May 1985. Where manually selectable gear boxes are utilized, a more complex linkage arrangement must be utilized to efficiently couple the rotational speed of the front wheels and the rear wheels. A mechanical linkage 460 is shown in FIG. 15 controlled by a manual shifter 462 for maintaining the transaxles 412, 452 in constant synchronization, and representing a selectable first gear, second gear, third gear, etc. for the combination of the two motors 410, 452. The linkage 460 can be a complex arrangement which selects various advantageous gear arrangements from each transaxle 412, 452. The linkage 460 further comprises a transmitter 464 which sends a signal along a linkage highway 466 to a controller 470. The controller 470 receives the gear selection information from the transmitter 464 controlling synchronization of motor speeds for each selected gear. A complex synchronization system can thus be derived taking full advantage of each motor's optimal horsepower such as an motor's optimal horsepower operating envelope. The controller 470 communicates to the motors 410, 450 via a highway 474. Such highway 474 can trigger various control mechanisms at each motor 410, 452 increasing or decreasing motor RPM in response to a particular position of the accelerator pedal, activated by a driver. The highway 474 could likewise modulate regulator valves in fuel delivery lines to the respective motors in the case of internal combustion engines overriding a particular position of the accelerator pedal, synchronizing front wheel and back wheel RPMs, by synchronizing the gear selection at each motors with the motor RPM for each respective motor 410, 450.

The same control system can be used in the configurations of FIGS. 13 and 14 as is shown in FIG. 15, if the vehicles of FIGS. 13 and 14 used manually operated trans-axles or transmissions.

Figure 16:
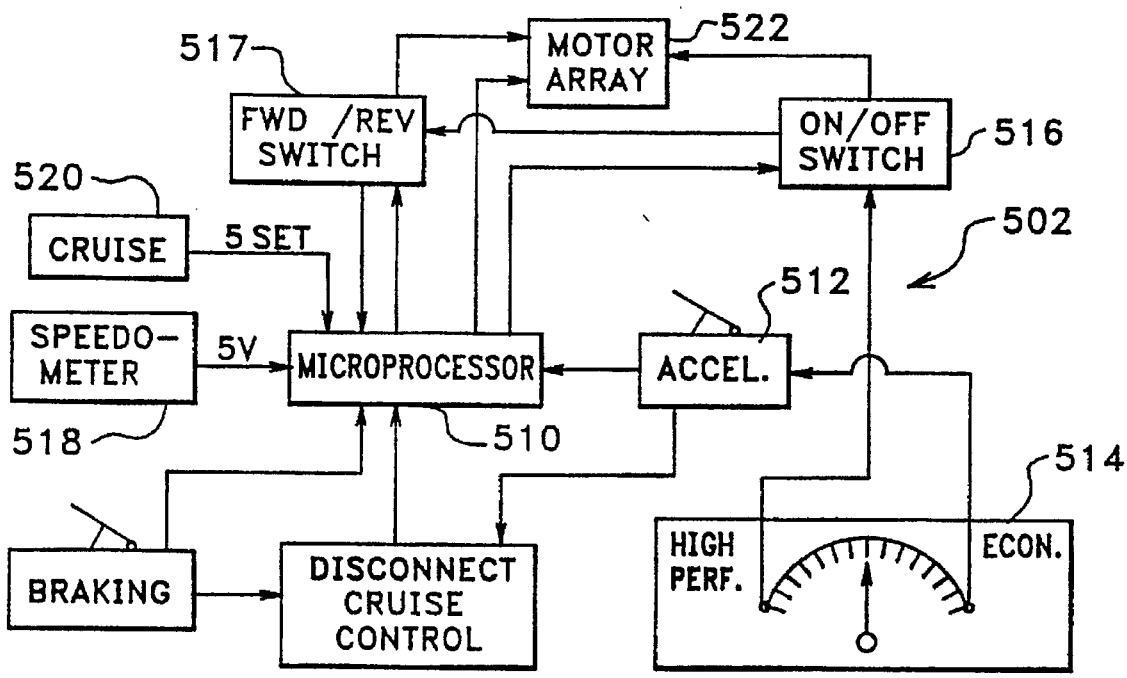
FIG. 16 is a schematic flow diagram of a pulsing vehicle drive system combined with a binary motor array of the present invention.

Shown in FIG. 16 is a control system 502 for combined control of a pulsing motor control and binary motor array. The control system includes a microprocessor 510, a logarithmic accelerator pedal 512 for signalling driver power demand (such as manufactured by Ohmite Mfg.) and a selector control 514 for driver input of motor operation mode, on a graduated scale between economy versus performance. As noted above, a pulsed "on" time of seven seconds corresponds to maximum economy, while maximum performance is obtained by terminating pulsing and going to "steady state" operation. A solid state on/off switch 516 (such as Model No. 1221B-7403 manufactured by Curtis PMC) controls power delivery to the motor array 550 and a linear potentiometer switch 517 controls the motor array 522 (including associated gearing as set forth above) between forward and reverse. A vehicle velocity sensor 518 provides the microprocessor 510 with a signal Sv and a cruise control 520 provided with on/off, set and resume controls provide the microprocessor 510 with a Sset signal.

In operation, the microprocessor 510 reads the input Sv from the vehicle velocity sensor 518 (i.e., between 0 and 120 MPH) and the accelerator pedal 512 position (i.e., at 1 or 10 or 100 percent of scale). The microprocessor 510 then compares these signals, and where the accelerator pedal 512 position indicates a vehicle velocity power demand less than that required to maintain the vehicle at the then existing velocity, the switch 516 disconnects or disables the motor array 522.

However, when the accelerator pedal 512 position indicates a vehicle velocity power demand greater than that required to maintain the vehicle at the then existing velocity (i.e., the driver wishes to accelerate), the switch 516 enables the motor array 522 and, as discussed above, the microprocessor 510 selects a motor array combination maintaining the vehicle velocity power requirements and make up any difference between the demanded power and the existing vehicle velocity power requirements. After the vehicle accelerates to the demanded velocity, the microprocessor 510 then utilizes the accelerator pedal 512 position to determine the pulse time on and off of the motor array 522, as also set forth in detail above.

After each pulse time "on" expires, the highest allowed vehicle velocity (Sh) is determined and compared to the set velocity (Sset) of the cruise control 520. This creates the reference for determination of the minimum allowed velocity (Sm), between which the vehicle velocity is maintained, such that variation in actual operating velocities equals Sset ± (Sh-Sset). By selecting the performance preference through selector control 514, the value of Sm is modified logarithmically from 10 to 100 percent between vehicle velocities of 80 to 1 MPH.

Regenerative braking is provided by initial motion of brake pedal 524, in 0-1-10 logarithmic fashion, reversing the power flow and recharging the battery stores as set forth above. At a threshold brake pedal 524 position, however, mechanical braking as is conventionally known can be employed.

Thus, the binary array can be used in effective combination with the pulsing system, providing an overall economy not before available. Moreover, the binary array of motors can include trucks with tractor and trailer(s). The trailer wheels can be non-steerable drive wheels or steerable drive wheels reducing the turning radius.

Although the present invention has been described with reference to a specific embodiment, those of skill in the art will recognize that changes may be made thereto without departing from the scope and spirit of the invention as set forth in the appended claims.

TABLE 1

Sheet 1/3

Weight 5915 lbm | Vehicle weight lbm 5915
Tire Radius 0.997 ft. | Rolling Resistance 0.015

| Pulse Cycle | | | Acceleration time | Eff. | lbf/lbm | | |
|---|---|---|---|---|---|---|---|
| Speed mph | accelerat | Final Speed | | | Power Used kw-h | K1 | K2 |
| 10 | 2.755 | 15.634 | 3 | 0.92 | 0.03243 | 188.746 | 0.095 |
| 10 | 2.749 | 17.496 | 4 | 0.92 | 0.04325 | 188.746 | 0.126 |
| 10 | 2.742 | 19.347 | 5 | 0.92 | 0.05406 | 188.746 | 0.157 |
| 10 | 2.735 | 21.187 | 6 | 0.92 | 0.06487 | 188.746 | 0.187 |
| 10 | 2.727 | 23.014 | 7 | 0.92 | 0.07568 | 188.746 | 0.216 |
| 20 | 2.713 | 25.549 | 3 | 0.92 | 0.03243 | 188.746 | 0.093 |
| 20 | 2.708 | 27.385 | 4 | 0.92 | 0.04325 | 188.746 | 0.124 |
| 20 | 2.702 | 29.211 | 5 | 0.92 | 0.05406 | 188.746 | 0.154 |
| 20 | 2.696 | 31.030 | 6 | 0.92 | 0.06487 | 188.746 | 0.184 |
| 20 | 2.691 | 32.841 | 7 | 0.92 | 0.07568 | 188.746 | 0.214 |
| 30 | 2.636 | 35.391 | 3 | 0.92 | 0.03243 | 188.746 | 0.091 |
| 30 | 2.628 | 37.166 | 4 | 0.92 | 0.04325 | 188.746 | 0.120 |
| 30 | 2.619 | 38.929 | 5 | 0.92 | 0.05406 | 188.746 | 0.150 |
| 30 | 2.611 | 40.679 | 6 | 0.92 | 0.06487 | 188.746 | 0.178 |
| 30 | 2.600 | 42.407 | 7 | 0.92 | 0.07568 | 188.746 | 0.207 |
| 40 | 2.533 | 45.181 | 3 | 0.92 | 0.03243 | 188.746 | 0.087 |
| 40 | 2.522 | 46.879 | 4 | 0.92 | 0.04325 | 188.746 | 0.116 |
| 40 | 2.512 | 48.562 | 5 | 0.92 | 0.05406 | 188.746 | 0.144 |
| 40 | 2.501 | 50.232 | 6 | 0.92 | 0.06487 | 188.746 | 0.171 |
| 40 | 2.489 | 51.880 | 7 | 0.92 | 0.07568 | 188.746 | 0.198 |
| 50 | 2.404 | 54.916 | 3 | 0.92 | 0.03243 | 188.746 | 0.083 |
| 50 | 2.391 | 56.521 | 4 | 0.92 | 0.04325 | 188.746 | 0.110 |
| 50 | 2.379 | 58.110 | 5 | 0.92 | 0.05406 | 188.746 | 0.136 |
| 50 | 2.366 | 59.680 | 6 | 0.92 | 0.06487 | 188.746 | 0.162 |
| 50 | 2.354 | 61.234 | 7 | 0.92 | 0.07568 | 188.746 | 0.188 |
| 60 | 2.225 | 64.551 | 3 | 0.92 | 0.03243 | 188.746 | 0.077 |
| 60 | 2.204 | 66.011 | 4 | 0.92 | 0.04325 | 188.746 | 0.101 |
| 60 | 2.183 | 67.442 | 5 | 0.92 | 0.05406 | 188.746 | 0.125 |
| 60 | 2.162 | 68.843 | 6 | 0.92 | 0.06487 | 188.746 | 0.148 |
| 60 | 2.144 | 70.231 | 7 | 0.92 | 0.07568 | 188.746 | 0.171 |
| A | B | C | D | E | F | G | H |

TABLE 1-continued

Sheet 2/3

| Coast Time | Total time sec | Mean Speed MPH | Range Miles | Constant speed of the pulsing cycle | | at the mean speed | |
|---|---|---|---|---|---|---|---|
| | | | | resistance lb | Torque ft-lb | RPM | HP |
| 17.911 | 20.911 | 12.817 | 89.519 | 92.884 | 92.578 | 140.520 | 2.47693 |
| 23.774 | 27.774 | 13.748 | 95.649 | 93.510 | 93.202 | 140.520 | 2.49362 |
| 29.558 | 34.558 | 14.673 | 101.622 | 94.176 | 93.866 | 140.520 | 2.51139 |
| 35.253 | 41.253 | 15.593 | 107.428 | 94.881 | 94.568 | 140.520 | 2.53018 |
| 40.844 | 47.844 | 16.507 | 113.050 | 95.624 | 95.308 | 140.520 | 2.54998 |
| 17.641 | 20.641 | 22.774 | 157.012 | 101.857 | 101.521 | 281.040 | 5.43242 |
| 23.425 | 27.425 | 23.692 | 162.768 | 102.937 | 102.597 | 281.040 | 5.49001 |
| 29.135 | 34.135 | 24.605 | 168.317 | 104.054 | 103.710 | 281.040 | 5.54956 |
| 34.770 | 40.770 | 25.515 | 173.725 | 105.208 | 104.861 | 281.040 | 5.61112 |
| 40.318 | 47.318 | 26.420 | 178.954 | 106.398 | 106.047 | 281.040 | 5.67462 |
| 17.143 | 20.143 | 32.696 | 219.974 | 115.791 | 115.409 | 421.560 | 9.26334 |
| 22.739 | 26.739 | 33.583 | 224.942 | 117.280 | 116.893 | 421.560 | 9.38246 |
| 28.257 | 33.257 | 34.464 | 229.696 | 118.799 | 118.406 | 421.560 | 9.50394 |
| 33.688 | 39.688 | 35.340 | 234.231 | 120.345 | 119.948 | 421.560 | 9.62768 |
| 38.995 | 45.995 | 36.204 | 238.363 | 121.910 | 121.508 | 421.560 | 9.75287 |
| 16.478 | 19.478 | 42.591 | 277.089 | 134.652 | 134.208 | 562.080 | 14.363 |
| 21.836 | 25.836 | 43.440 | 281.145 | 136.501 | 136.051 | 562.080 | 14.5602 |
| 27.111 | 32.111 | 44.281 | 284.957 | 138.370 | 137.913 | 562.080 | 14.7596 |
| 32.306 | 38.306 | 45.116 | 288.619 | 140.260 | 139.798 | 562.080 | 14.9612 |
| 37.383 | 44.383 | 45.940 | 291.862 | 142.160 | 141.691 | 562.080 | 15.1638 |
| 15.639 | 18.639 | 52.458 | 326.580 | 158.398 | 157.876 | 702.600 | 21.1199 |
| 20.710 | 24.710 | 53.261 | 329.680 | 160.547 | 160.017 | 702.600 | 21.4064 |
| 25.698 | 30.698 | 54.055 | 332.546 | 162.705 | 162.168 | 702.600 | 21.6941 |
| 30.594 | 36.594 | 54.840 | 335.145 | 164.869 | 164.325 | 702.600 | 21.9827 |
| 35.397 | 42.397 | 55.617 | 337.532 | 167.041 | 166.490 | 702.600 | 22.2723 |
| 14.483 | 17.483 | 62.276 | 363.642 | 186.917 | 186.300 | 843.120 | 29.9069 |
| 19.101 | 23.101 | 63.006 | 364.604 | 189.233 | 188.608 | 843.120 | 30.2774 |
| 23.605 | 28.605 | 63.721 | 365.280 | 191.528 | 190.896 | 843.120 | 30.6447 |
| 27.990 | 33.990 | 64.422 | 365.681 | 193.801 | 193.162 | 843.120 | 31.0084 |
| 32.302 | 39.302 | 65.115 | 366.330 | 196.077 | 195.430 | 843.120 | 31.3725 |
| I | J | K | L | M | N | O | P |

Sheet 3/3

| Eff | Power use Kw-hr | Ramge Miles | % improvment |
|---|---|---|---|
| 0.75 | 0.01431 | 158.297 | −126.65 |
| 0.75 | 0.01914 | 157.237 | −126 |
| 0.75 | 0.02398 | 156.125 | −125.43 |
| 0.75 | 0.02884 | 154.965 | −124.94 |
| 0.75 | 0.03371 | 153.762 | −124.51 |
| 0.78 | 0.02979 | 150.126 | −8.8788 |
| 0.78 | 0.04 | 148.551 | −8.1153 |
| 0.78 | 0.05033 | 146.958 | −7.4148 |
| 0.78 | 0.06078 | 145.345 | −6.7346 |
| 0.78 | 0.07134 | 143.719 | −6.0918 |
| 0.75 | 0.05156 | 126.982 | 37.0872 |
| 0.75 | 0.06932 | 125.369 | 37.6094 |
| 0.75 | 0.08733 | 123.767 | 38.0984 |
| 0.75 | 0.10557 | 122.176 | 38.5555 |
| 0.75 | 0.12394 | 120.608 | 38.9386 |
| 0.78 | 0.07433 | 113.563 | 56.3615 |
| 0.78 | 0.09994 | 112.024 | 56.728 |
| 0.78 | 0.12591 | 110.511 | 57.0676 |
| 0.78 | 0.15226 | 109.022 | 57.3949 |
| 0.78 | 0.1788 | 107.565 | 57.6721 |
| 0.82 | 0.09948 | 101.489 | 67.3961 |
| 0.82 | 0.13367 | 100.131 | 67.6472 |
| 0.82 | 0.1683 | 98.8026 | 67.8795 |
| 0.82 | 0.20329 | 97.5053 | 68.0902 |
| 0.82 | 0.23863 | 96.2374 | 68.285 |
| 0.86 | 0.12598 | 90.1994 | 74.2548 |
| 0.86 | 0.16853 | 89.0957 | 74.3396 |
| 0.86 | 0.21122 | 88.0278 | 74.4067 |
| 0.86 | 0.25396 | 86.9953 | 74.4568 |
| 0.86 | 0.2971 | 85.9857 | 74.5266 |
| Q | R | S | T |

TABLE 2

(1/5)

Tractive force 374.849* HP/mph  
Power = 248 Based on binary motors of 128, 64, 32, 16 & 8 hp  
Vehicle weight lbm 40000

Weight lb 40000  
Tire Radius 1.667 ft.  
Rolling Resistance Based on a Battery capicity of Pulse Cycle

| speed mph | acceleration ft/sec sq | Final Speed mph | Acceleration time | Eff. | Power Used kw-hr | K1 |
|---|---|---|---|---|---|---|
| 10 | 3.249 | 16.646 | 3 | 0.92 | 0.03243 | 303.913 |
| 10 | 3.249 | 18.861 | 4 | 0.92 | 0.04325 | 303.913 |
| 10 | 3.249 | 21.077 | 5 | 0.92 | 0.05406 | 303.913 |
| 10 | 3.249 | 23.292 | 6 | 0.92 | 0.06487 | 303.913 |
| 10 | 3.249 | 25.507 | 7 | 0.92 | 0.07568 | 303.913 |
| 20 | 2.501 | 25.115 | 3 | 0.92 | 0.03243 | 303.913 |
| 20 | 2.501 | 26.820 | 4 | 0.92 | 0.04325 | 303.913 |
| 20 | 2.501 | 28.524 | 5 | 0.92 | 0.05406 | 303.913 |
| 20 | 2.501 | 30.229 | 6 | 0.92 | 0.06487 | 303.913 |
| 20 | 2.501 | 31.934 | 7 | 0.92 | 0.07568 | 303.913 |
| 30 | 1.775 | 33.630 | 3 | 0.92 | 0.03243 | 303.913 |
| 30 | 1.775 | 34.840 | 4 | 0.92 | 0.04325 | 303.913 |
| 30 | 1.775 | 36.050 | 5 | 0.92 | 0.05406 | 303.913 |
| 30 | 1.775 | 37.259 | 6 | 0.92 | 0.06487 | 303.913 |
| 30 | 1.775 | 38.469 | 7 | 0.92 | 0.07568 | 303.913 |
| 40 | 1.288 | 42.635 | 3 | 0.92 | 0.03243 | 303.913 |
| 40 | 1.288 | 43.514 | 4 | 0.92 | 0.04325 | 303.913 |
| 40 | 1.288 | 44.392 | 5 | 0.92 | 0.05406 | 303.913 |
| 40 | 1.288 | 45.271 | 6 | 0.92 | 0.06487 | 303.913 |
| 40 | 1.288 | 46.149 | 7 | 0.92 | 0.07568 | 303.913 |
| 50 | 0.974 | 51.992 | 3 | 0.92 | 0.03243 | 303.913 |
| 50 | 0.974 | 52.656 | 4 | 0.92 | 0.04325 | 303.913 |
| 50 | 0.974 | 53.320 | 5 | 0.92 | 0.05406 | 303.913 |
| 50 | 0.974 | 53.984 | 6 | 0.92 | 0.06487 | 303.913 |
| 50 | 0.974 | 54.648 | 7 | 0.92 | 0.07568 | 303.913 |
| 55 | 0.843 | 56.724 | 3 | 0.92 | 0.03243 | 303.913 |
| 55 | 0.843 | 57.299 | 4 | 0.92 | 0.04325 | 303.913 |
| 55 | 0.843 | 57.873 | 5 | 0.92 | 0.05406 | 303.913 |
| 55 | 0.843 | 58.448 | 6 | 0.92 | 0.06487 | 303.913 |
| 55 | 0.843 | 59.022 | 7 | 0.92 | 0.07568 | 303.913 |
| A | B | C | D | E | F | G |

(2/5)

0.015 lbf/lbm  
50.000 kw-hr  
Constant speed at the mean speed of the pulsing cycle

| K2 | Coast Time | Total time sec | Mean Speed mph | Range Miles | resistance lb | Torque ft-lb |
|---|---|---|---|---|---|---|
| 0.070 | 21.156 | 24.156 | 13.323 | 137.811 | 602.532 | 1004.240 |
| 0.093 | 28.173 | 32.173 | 14.431 | 149.105 | 602.532 | 1004.240 |
| 0.116 | 35.160 | 40.160 | 15.538 | 160.325 | 602.532 | 1004.240 |
| 0.139 | 42.109 | 48.109 | 16.646 | 171.460 | 602.532 | 1004.240 |
| 0.161 | 49.015 | 56.015 | 17.754 | 182.503 | 602.532 | 1004.240 |
| 0.054 | 16.292 | 19.292 | 22.557 | 186.349 | 610.127 | 1016.899 |
| 0.071 | 21.707 | 25.707 | 23.410 | 193.270 | 610.127 | 1016.899 |
| 0.089 | 27.108 | 32.108 | 24.262 | 200.146 | 610.127 | 1016.899 |
| 0.107 | 32.491 | 38.491 | 25.115 | 206.975 | 610.127 | 1016.899 |
| 0.125 | 37.855 | 44.855 | 25.967 | 213.753 | 610.127 | 1016.899 |
| 0.038 | 11.568 | 14.568 | 31.815 | 198.463 | 622.787 | 1037.999 |
| 0.051 | 15.418 | 19.418 | 32.420 | 202.177 | 622.787 | 1037.999 |
| 0.063 | 19.263 | 24.263 | 33.025 | 205.870 | 622.787 | 1037.999 |
| 0.076 | 23.102 | 29.102 | 33.630 | 209.544 | 622.787 | 1037.999 |
| 0.089 | 26.934 | 33.934 | 34.235 | 213.196 | 622.787 | 1037.999 |
| 0.028 | 8.401 | 11.401 | 41.318 | 201.710 | 640.510 | 1067.538 |
| 0.037 | 11.199 | 15.199 | 41.757 | 203.824 | 640.510 | 1067.538 |
| 0.046 | 13.995 | 18.995 | 42.196 | 205.930 | 640.510 | 1067.538 |
| 0.055 | 16.789 | 22.789 | 42.635 | 208.025 | 640.510 | 1067.538 |
| 0.064 | 19.580 | 26.580 | 43.075 | 210.112 | 640.510 | 1067.538 |
| 0.021 | 6.351 | 9.351 | 50.996 | 204.187 | 663.297 | 1105.517 |
| 0.028 | 8.466 | 12.466 | 51.328 | 205.500 | 663.297 | 1105.517 |
| 0.035 | 10.581 | 15.581 | 51.660 | 206.809 | 663.297 | 1105.517 |
| 0.042 | 12.695 | 18.695 | 51.992 | 208.113 | 663.297 | 1105.517 |
| 0.049 | 14.808 | 21.808 | 52.324 | 209.412 | 663.297 | 1105.517 |
| 0.018 | 5.496 | 8.496 | 55.862 | 203.231 | 676.589 | 1127.671 |
| 0.024 | 7.327 | 11.327 | 56.149 | 204.265 | 676.589 | 1127.671 |
| 0.030 | 9.158 | 14.158 | 56.437 | 205.296 | 676.589 | 1127.671 |
| 0.036 | 10.989 | 16.989 | 56.724 | 206.323 | 676.589 | 1127.671 |
| 0.042 | 12.818 | 19.818 | 57.011 | 207.347 | 676.589 | 1127.671 |
| H | I | J | K | L | M | N | O |

(3/5)

| RPM | HP | Eff | Power used Kw-hr | Ramge Miles | % improvement |
|---|---|---|---|---|---|
| 84.032 | 16.068 | 0.75 | 0.10724 | 31.285 | 69.755 |
| 84.032 | 16.068 | 0.75 | 0.14283 | 31.285 | 69.722 |
| 84.032 | 16.068 | 0.75 | 0.17829 | 31.285 | 69.679 |
| 84.032 | 16.068 | 0.75 | 0.21358 | 31.285 | 69.627 |
| 84.032 | 16.068 | 0.75 | 0.24867 | 31.285 | 69.566 |
| 168.064 | 32.540 | 0.78 | 0.16678 | 32.132 | 80.553 |
| 168.064 | 32.540 | 0.78 | 0.22224 | 32.132 | 80.540 |
| 168.064 | 32.540 | 0.78 | 0.27757 | 32.132 | 80.525 |
| 168.064 | 32.540 | 0.78 | 0.33276 | 32.132 | 80.505 |
| 168.064 | 32.540 | 0.78 | 0.38777 | 32.132 | 80.483 |
| 252.096 | 49.823 | 0.75 | 0.20054 | 30.268 | 83.826 |
| 252.096 | 49.823 | 0.75 | 0.26731 | 30.268 | 83.821 |
| 252.096 | 49.823 | 0.75 | 0.33401 | 30.268 | 83.815 |
| 252.096 | 49.823 | 0.75 | 0.40062 | 30.268 | 83.808 |
| 252.096 | 49.823 | 0.75 | 0.46713 | 30.268 | 83.799 |
| 336.129 | 68.321 | 0.78 | 0.20693 | 30.608 | 84.326 |
| 336.129 | 68.321 | 0.78 | 0.27587 | 30.608 | 84.324 |
| 336.129 | 68.321 | 0.78 | 0.34478 | 30.608 | 84.321 |
| 336.129 | 68.321 | 0.78 | 0.41364 | 30.608 | 84.317 |
| 336.129 | 68.321 | 0.78 | 0.48245 | 30.608 | 84.313 |
| 420.161 | 88.440 | 0.82 | 0.20898 | 31.072 | 84.480 |
| 420.161 | 88.440 | 0.82 | 0.27862 | 31.072 | 84.478 |
| 420.161 | 88.440 | 0.82 | 0.34824 | 31.072 | 84.477 |
| 420.161 | 88.440 | 0.82 | 0.41784 | 31.072 | 84.475 |
| 420.161 | 88.440 | 0.82 | 0.48741 | 31.072 | 84.473 |
| 462.177 | 99.234 | 0.86 | 0.20315 | 24.919 | 84.034 |
| 462.177 | 99.234 | 0.86 | 0.27085 | 24.919 | 84.033 |
| 462.177 | 99.234 | 0.86 | 0.33854 | 24.919 | 84.032 |
| 462.177 | 99.234 | 0.86 | 0.40621 | 24.919 | 84.031 |
| 462.177 | 99.234 | 0.86 | 0.47387 | 24.919 | 84.029 |
| P | Q | R | S | T | U |

(4/5)

Electric Bus Motor Efficiency Analysis  
Weight = 40000 Lbm  
Binary motors based  
Drag coef = 0.35 Rolling Resistance =

Tire 20.5/12R20 1.6667 Ft radius  
Acceleration time 25 Seconds

| Velocity MPH | Resistance Lbf | Wh Torque Ft-Lb | Wh RPM | Power HP | Gear Reduction |
|---|---|---|---|---|---|
| 0.0001 | 2877.329 | 4793.630 | 0.001 | 0.001 | 2.400 |
| 5 | 2878.980 | 4796.381 | 42.034 | 38.387 | 2.400 |
| 10 | 2883.933 | 4804.633 | 84.067 | 76.905 | 2.400 |
| 15 | 2892.188 | 4818.385 | 126.101 | 115.688 | 2.400 |
| 20 | 2903.745 | 4837.639 | 168.135 | 154.867 | 2.400 |
| 25 | 2918.604 | 4862.394 | 210.169 | 194.575 | 2.400 |
| 30 | 2936.764 | 4892.650 | 252.202 | 234.943 | 2.400 |
| A | B | C | D | E | F |

Cruise time 20 Seconds

| | | | | | |
|---|---|---|---|---|---|
| 30 | 659.435 | 1098.619 | 252.202 | 52.755 | 2.400 |

Coast time 8 Seconds

| K1 | | K2 | | Time in sec | |
|---|---|---|---|---|---|
| 30 | 790.517 | 0.066724626 | 52.74697213 | (FROM 30 MPH TO 27.487 MPH) | |
| 27.487 | | | | | |
| 20 | 790.517 | 0.132181045 | 104.4914054 | (FROM 20 MPH TO 15 MPH) | |

TABLE 2-continued

Coast time with regenerative braking to stop

| | | | |
|---|---|---|---|
| 30 | 133.948 | 0.67335995 | 90.19553833 |
| 0 | | | |

Distance travled with regenerative braking (ft)

| | |
|---|---|
| 30 | 1984.211648 |
| 0 | |

Regenerated Power During Braking Kilowatt Hours 22.4176232

(5/5)

on 25 seconds to 30 mph
0.015 lbf/lbm

| Motor RPM | Eff | Power kw | motor HP |
|---|---|---|---|
| 0.002 | 0.000 | 5.724 | 8 |
| 100.881 | 0.880 | 32.541 | 32 |
| 201.762 | 0.880 | 65.195 | 64 & 8 |
| 302.643 | 0.880 | 98.072 | 64, 32, & 16 |
| 403.524 | 0.900 | 128.368 | 128, 16, & 8 |
| 504.405 | 0.910 | 159.509 | 128, & 64 |
| 605.286 | 0.900 | 194.741 | 128, 64, 32, & 8 |
| G | H | I | J |
| 605.286 | 0.900 | 43.728 | 8 & 4 |

What is claimed:

1. A power system for a vehicle having rotating masses and inertia, wherein the vehicle is capable of forward motion and the vehicle has a first output wheel for placing the vehicle in motion, the power system comprising:

a controller receiving a desired velocity signal corresponding to a desired mean velocity and a desired minimum and maximum velocity;

a motor primarily adapted to continuously operate at substantially maximum efficiency when provided with energy for driving the rotating masses and the first output wheel of the vehicle; and means for selectively allowing communication of energy to the first output wheel for sustaining forward motion of the vehicle;

the controller communicating pulsed signals to the means for selectively allowing communication of energy for intermittently supplying energy for rotation to the first output wheel in power pulses in accordance with the desired velocity signal received by the controller, whereby the vehicle automatically accelerates and decelerates between the minimum and maximum desired velocity and is substantially maintained at the mean velocity.

2. The system according to claim 1, wherein the motor comprises an electric motor and the means for electively communicating energy comprises switching means in communication with a battery pack.

3. The system according to claim 2, wherein the electric motor can be reversed in operation to become an electrical generator for producing energy driven by the first rotational output wheel; and the controller provides a braking pulsed signal to the means for selectively communicating energy, the means for selectively communicating energy thereby communicating the energy generated by the electric motor as an electrical generator in pulses according to the braking pulsed signal from the controller, the energy being further communicated to recharge the battery pack.

4. The system according to claim 3, wherein the battery pack is provided with a thermocouple, the thermocouple providing a temperature signal to the controller; and the controller providing the braking pulsed signal to the means for selectively communicating energy to control recharge of the battery pack in response to the temperature signal.

5. The system according to claim 1 further comprising:

a cruise control system; and a speedometer;

the cruise control system sending the desired velocity signal to the controller and the speedometer sending actual vehicle velocity to the controller, the controller sending an appropriate signal to the means for selectively communicating energy.

6. The system according to claim 1 further comprising a second motor arranged to drive a second rotational output wheel of the vehicle;

the second rotational output wheel being in communication with the means for selectively communicating energy.

7. The system according to claim 6, wherein the second motor can be reversed in operation to become a power generator creating rotational resistance on the second rotational output wheel, the power generator controlled in pulsing fashion by the controller communicating to the means for selectively communicating energy.

8. A method for powering a vehicle comprising:

selecting a desired velocity;

providing an automatic control means which accelerates the vehicle at a rate of between 1.6 and 2.7 ft/sec$^2$ for a period of between three and seven seconds;

after the acceleration is applied, automatically ceasing delivery of power to the vehicle during a coast-down period until the desired velocity is again reached; and automatically repeating the pulsed acceleration and coast-down until the desired velocity is changed.

9. A method according to claim 8, wherein at a desired velocity of 30 MPH the rate of acceleration is about 2.6 ft/sec$^2$.

10. A method according to claim 8, wherein at a desired velocity of 40 MPH the acceleration is about 2.5 ft/sec$^2$.

11. A method according to claim 8, wherein at a desired velocity of 50 MPH the acceleration is about 2.3 ft/sec$^2$.

12. A method according to claim 8, wherein at a desired velocity of 60 MPH the acceleration is about 2.2 ft/sec$^2$.

13. A method according to claim 8, wherein at a desired velocity of 80 MPH the acceleration is about 1.8 ft/sec$^2$.

14. A power system for a vehicle having rotating masses and inertia, wherein the vehicle is capable of forward motion and the vehicle has a first output wheel for placing the vehicle in motion, the power system comprising:

a controller receiving a desired velocity signal corresponding to a desired mean velocity and a desired minimum and maximum velocity;

a motor primarily adapted to continuously operate at substantially maximum efficiency when provided with energy for driving the rotating masses and the first output wheel of the vehicle; and an means for selectively communicating energy to the first output wheel for sustaining forward motion of the vehicle;

a cruise control system; and a speedometer;

the cruise control sending the desired velocity signal to the controller and the speedometer sending actual vehicle velocity to the controller, the controller communicating appropriate pulsed signals to the means for selectively communicating energy in accordance with the desired velocity signal received by the controller for intermittently supplying energy for rotation to the first output wheel in power pulses in accordance with the pulsed signals from the controller, whereby the vehicle automatically accelerates and decelerates between the minimum and maximum desired velocity and is substantially maintained at the mean velocity.

15. A power system for a vehicle having rotating masses and inertia, wherein the vehicle is capable of forward motion and the vehicle has a first output wheel for placing the vehicle in motion, the power system comprising:

a controller receiving a desired velocity signal corresponding to a desired mean velocity and a desired minimum and maximum velocity;

a motor primarily adapted to continuously operate at substantially maximum efficiency when provided with energy for driving the rotating masses and the first output wheel of the vehicle;

a speedometer;

means for selectively communicating energy to the first output wheel for sustaining forward motion of the vehicle;

a voice actuated cruise control system adapted to send the desired velocity signal to the controller and the speedometer sending actual vehicle velocity to the controller, the controller sending an appropriate signal to the means for communicating energy; and the controller communicating pulsed signals to the means for selectively communicating energy for intermittently supplying energy for rotation to the first output wheel in power pulses in accordance with the desired velocity signal received by the controller, whereby the vehicle automatically accelerates and decelerates between the minimum and maximum desired velocity and is maintained at substantially the mean velocity.

16. A power system for a vehicle having rotating masses and inertia, wherein the vehicle is capable of forward motion and the vehicle has a first output wheel for placing the vehicle in motion, the power system comprising:

a controller receiving a desired velocity signal corresponding to a desired mean velocity and a desired minimum and maximum velocity;

a first motor primarily adapted to continuously operate at substantially maximum efficiency when provided with energy for driving the rotating masses and the first output wheel of the vehicle;

a second motor also primarily adapted to continuously operate at substantially maximum efficiency when provided with energy for driving the rotating masses and a second rotational output wheel of the vehicle; and means for selectively communicating energy to the first and second output wheel for sustaining forward motion of the vehicle;

the first and second motors each having an optimum horsepower output, the second motor having an optimally efficient horsepower output in an amount substantially equal to twice the optimally efficient horsepower output of the first motor, the controller sending pulsed signals to the means for selectively communicating energy for intermittently supplying energy for rotation to the first and second output wheels in power pulses in accordance with the desired velocity signal received by the controller, whereby the vehicle automatically accelerates and decelerates between the minimum and maximum desired velocity and is maintained at substantially the mean velocity.

17. A power system for a vehicle having rotating masses and inertia, wherein the vehicle is capable of forward motion and the vehicle has an output wheel for placing the vehicle in motion, the power system comprising:

a controller receiving a desired velocity signal corresponding to a desired mean velocity and a desired minimum and maximum velocity;

a first motor primarily adapted to continuously operate at substantially maximum efficiency when provided with energy for driving the rotating masses and the output wheel of the vehicle;

a second motor also primarily adapted to continuously operate at substantially maximum efficiency when provided with energy for driving the rotating masses and the output wheel of the vehicle; and means for selectively communicating energy to the output wheel for sustaining forward motion of the vehicle;

the first and second motors each having an optimum horsepower output, the second motor having an optimally efficient horsepower output substantially equal to twice the optimally efficient horsepower output of the first motor, the controller sending pulsed signals to the means for selectively communicating energy for intermittently supplying energy for rotation to the output wheel in power pulses in accordance with the desired velocity signal received by the controller, whereby the vehicle automatically accelerates and decelerates between the minimum and maximum desired velocity and is substantially maintained at the mean velocity.

18. A method for optimizing the efficiency of a motor vehicle having a motor, rotating masses, inertia, a controller and a means for selectively allowing communication of energy for rotation to the motor, wherein the vehicle is capable of forward motion and the vehicle has a first output wheel for placing the vehicle in motion, the method comprising the steps of:

providing the controller with a desired velocity signal corresponding to a desired mean velocity and a desired minimum and maximum velocity;

operating the motor continuously at substantially maximum efficiency when the motor is provided with energy and thereby driving the rotating masses and the first output wheel of the vehicle; and providing pulsed signals corresponding to the desired velocities from the controller to the means for selectively allowing communication of energy to the first output wheel and thereby intermittently supplying energy to the first output wheel in power pulses in accordance with the desired velocity signal received by the controller, whereby the vehicle automatically accelerates and decelerates between the minimum and maximum desired velocity and is substantially maintained at the mean velocity.

19. The method according to claim 18, wherein the motor comprises an electric motor and the means for selectively communicating energy comprises a switching means in communication with a battery pack.

20. The method according to claim 19, wherein the electric motor can be reversed in operation to become an electrical generator for producing energy driven by the first rotational output wheel, the method further comprising the step of providing a braking pulsed signal from the controller to the means for selectively communicating energy, the means for selectively communicating energy thereby allowing the energy generated by the electric motor as an electrical generator in pulses according to the braking pulsed signal from the controller, the energy being further communicated to recharge the battery pack.

21. The method according to claim 20, wherein the battery pack is provided with a thermocouple, the thermocouple providing a temperature signal to the controller, and further comprising the step of providing the braking pulsed signal from the controller to the means for selectively communicating energy to control recharge of the battery pack in response to the temperature signal.

22. The method according to claim 19, wherein the vehicle further comprises a cruise control system and a speedometer, the method further comprising the step of sending the desired velocity signal from the cruise control system to the controller and the speedometer sending actual vehicle velocity to the controller, the controller sending an appropriate signal to the means for selectively communicating energy.

23. The method according to claim 22, wherein the cruise control system is voice activated.

24. The method according to claim 19 further comprising a second motor arranged to drive a second rotational output wheel of the vehicle, the second motor being in communication with the means for selectively communicating energy.

25. The method according to claim 24, wherein the first and second motors each have an optimum efficiency horsepower output, the second motor being selected to have an optimum efficiency horsepower output in an amount substantially equal to twice the optimum efficiency horsepower output of the first motor.

26. The method according to claim 25, wherein the second motor can be reversed in operation to become a power generator creating rotational resistance on the second rotational output wheel, the power generator controlled in pulsing fashion by the controller communicating to the means for selectively communicating energy.

* * * * *